US010003294B2

(12) United States Patent
Hara

(10) Patent No.: US 10,003,294 B2
(45) Date of Patent: Jun. 19, 2018

(54) CONTROL APPARATUS OF ROTARY ELECTRIC MACHINE AND ELECTRIC POWER STEERING APPARATUS USING THE SAME

(71) Applicant: DENSO CORPORATION, Kariya, Aichi-pref. (JP)

(72) Inventor: Yoshimichi Hara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 15/605,718

(22) Filed: May 25, 2017

(65) Prior Publication Data
US 2017/0346436 A1 Nov. 30, 2017

(30) Foreign Application Priority Data

May 27, 2016 (JP) ................. 2016-106190

(51) Int. Cl.
*H02P 27/06* (2006.01)
*H02P 29/024* (2016.01)
*H02P 29/028* (2016.01)
*B62D 5/04* (2006.01)
*B62D 5/00* (2006.01)

(52) U.S. Cl.
CPC ............ *H02P 27/06* (2013.01); *B62D 5/0463* (2013.01); *H02P 29/026* (2013.01); *H02P 29/028* (2013.01); *B62D 5/008* (2013.01); *B62D 5/0412* (2013.01)

(58) Field of Classification Search
CPC ...... H02P 27/06; H02P 29/026; H02P 29/028; B62D 5/0463

USPC ......................................................... 318/440
See application file for complete search history.

(56) References Cited

U.S. PATENT DOCUMENTS

| 4,999,561 A | * | 3/1991 | Kaga ...................... H02M 7/48 318/798 |
| 5,694,010 A | * | 12/1997 | Oomura ............... H02H 7/0833 318/400.07 |

(Continued)

FOREIGN PATENT DOCUMENTS

| JP | H07-33042 | 2/1995 |
| JP | 2004-276833 A | 10/2004 |

(Continued)

*Primary Examiner* — Kawing Chan
(74) *Attorney, Agent, or Firm* — Knobbe, Martens, Olson & Bear, LLP

(57) ABSTRACT

An apparatus for controlling a rotary electric machine includes: first and second inverters corresponding to first and second winding groups; first and second voltage detectors; and first and second control units. Each of the first and second inverters includes plurality of switching elements. The first and second voltage detectors each detects input voltage of corresponding inverter. The first control unit limits a first current command value of the first winding group, when both of the first and second inverter input voltages are in normal, and a first differential value is larger than a determination threshold, and the second control unit limits a second current command value of the second winding group, when both of the first and second inverter input voltages are normal, and a second differential value is larger than the determination threshold.

7 Claims, 19 Drawing Sheets

(56) References Cited

U.S. PATENT DOCUMENTS

| | | | | |
|---|---|---|---|---|
| 8,339,080 B2* | 12/2012 | Suzuki | ............... | B62D 5/0481 |
| | | | | 318/400.11 |
| 8,952,637 B2* | 2/2015 | Suzuki | ................... | H02P 25/22 |
| | | | | 318/400.01 |
| 9,692,343 B2* | 6/2017 | Kuramitsu | .............. | H02P 29/64 |
| 2014/0253009 A1* | 9/2014 | Kimpara | ............... | B62D 5/046 |
| | | | | 318/496 |
| 2016/0204727 A1* | 7/2016 | Fujii | ...................... | H02P 21/22 |
| | | | | 318/400.02 |

FOREIGN PATENT DOCUMENTS

| | | |
|---|---|---|
| JP | 2004-276834 | 10/2004 |
| JP | 2015-189442 | 11/2015 |

* cited by examiner

FIG.5

| FAILURE MODE | | CPU1 | | | | CPU2 | | | |
|---|---|---|---|---|---|---|---|---|---|
| | | POWER RELAY 130 OFF V1 [A/D] | POWER RELAY 130 ON V1 [A/D] | POWER RELAY 230 OFF V2 [COMMUNICATION] | POWER RELAY 230 ON V2 [COMMUNICATION] | POWER RELAY 130 OFF V1 [COMMUNICATION] | POWER RELAY 130 ON V1 [COMMUNICATION] | POWER RELAY 230 OFF V2 [A/D] | POWER RELAY 230 ON V2 [A/D] |
| NORMAL | | 0 | +B | 0 | +B | 0 | +B | 0 | +B |
| PIG1 POWER SYSTEM | POWER RELAY SHORT | +B | +B | 0 | +B | +B | +B | 0 | +B |
| | POWER SYSTEM OPEN, GROUND FAULT | 0 | 0 | 0 | +B | 0 | 0 | 0 | +B |
| POWER SOURCE VOLTAGE DETECTION 140 | FIXED TO +B | +B | +B | 0 | +B | +B | +B | 0 | +B |
| | FIXED TO GND | 0 | 0 | 0 | +B | 0 | 0 | 0 | +B |
| PIG2 POWER SYSTEM | POWER RELAY SHORT | 0 | +B | +B | +B | 0 | +B | +B | +B |
| | POWER SYSTEM OPEN, GROUND FAULT | 0 | +B | 0 | 0 | 0 | +B | 0 | 0 |
| POWER SOURCE VOLTAGE DETECTION 240 | FIXED TO +B | 0 | +B | 0 | +B | 0 | +B | +B | +B |
| | FIXED TO GND | 0 | +B | 0 | 0 | 0 | +B | 0 | 0 |
| COMMUNICATION BETWEEN CPUs | CPU1→2 ABNORMAL CONDITION | 0 | +B | × | +B | × | × | 0 | +B |
| | CPU2→1 ABNORMAL CONDITION | 0 | +B | 0 | × | 0 | +B | 0 | +B |

FIG.12

| | | CPU1 | | | | | | | | CPU2 | | | | | | |
|---|---|---|---|---|---|---|---|---|---|---|---|---|---|---|---|---|
| | | POWER RELAY 130 OFF | | POWER RELAY 130 ON | | POWER RELAY 230 OFF | | POWER RELAY 230 ON | | POWER RELAY 130 OFF | | POWER RELAY 130 ON | | POWER RELAY 230 OFF | | POWER RELAY 230 ON |
| FAILURE MODE | | V1(a) [A/D] | V1(b) [A/D] | V1(a) [A/D] | V1(b) [A/D] | V2(a) [COMMUNI-CATION] | V2(b) [COMMUNI-CATION] | V2(a) [COMMUNI-CATION] | V2(b) [COMMUNI-CATION] | V1(a) [COMMUNI-CATION] | V1(b) [COMMUNI-CATION] | V1(a) [COMMUNI-CATION] | V1(b) [COMMUNI-CATION] | V2(a) [A/D] | V2(b) [A/D] | V2(a) [A/D] | V2(b) [A/D] |
| NORMAL | | 0 | 0 | +B | +B | 0 | 0 | +B | +B | 0 | 0 | +B | +B | 0 | 0 | +B | +B |
| PIG1 POWER SYSTEM | POWER RELAY SHORT | +B | +B | +B | +B | 0 | 0 | +B | +B | +B | +B | +B | +B | 0 | 0 | +B | +B |
| | POWER SYSTEM OPEN, GROUND FAULT | 0 | 0 | 0 | 0 | +B | +B | 0 | 0 | 0 | +B | 0 | 0 | 0 | 0 | +B | 0 |
| POWER SOURCE VOLTAGE DETECTION 140 | FIXED TO +B | +B | 0 | +B | +B | 0 | 0 | +B | +B | +B | 0 | +B | +B | 0 | 0 | +B | +B |
| | FIXED TO GND | 0 | 0 | 0 | 0 | 0 | 0 | +B | +B | 0 | 0 | +B | +B | 0 | 0 | +B | +B |
| POWER SOURCE VOLTAGE DETECTION 145 | FIXED TO +B | 0 | +B | +B | +B | 0 | 0 | +B | +B | +B | +B | +B | +B | 0 | 0 | +B | +B |
| | FIXED TO GND | 0 | 0 | +B | 0 | 0 | 0 | +B | +B | 0 | 0 | +B | +B | 0 | 0 | +B | +B |
| PIG2 POWER SYSTEM | POWER RELAY SHORT | 0 | 0 | +B | +B | +B | +B | +B | +B | 0 | 0 | +B | +B | +B | +B | +B | +B |
| | POWER SYSTEM OPEN, GROUND FAULT | 0 | 0 | +B | +B | 0 | 0 | 0 | 0 | 0 | 0 | +B | +B | 0 | 0 | 0 | 0 |
| POWER SOURCE VOLTAGE DETECTION 240 | FIXED TO +B | 0 | 0 | +B | +B | +B | +B | +B | +B | 0 | 0 | +B | +B | +B | +B | +B | +B |
| | FIXED TO GND | 0 | 0 | +B | +B | 0 | 0 | +B | +B | 0 | 0 | +B | +B | 0 | 0 | +B | +B |
| POWER SOURCE VOLTAGE DETECTION 245 | FIXED TO +B | 0 | 0 | +B | +B | 0 | 0 | +B | +B | 0 | +B | +B | +B | 0 | +B | +B | +B |
| | FIXED TO GND | 0 | 0 | +B | +B | 0 | 0 | +B | +B | 0 | 0 | +B | +B | 0 | 0 | +B | +B |
| COMMUNICATION BETWEEN CPUs | CPU1→2 ABNORMAL CONDITION | 0 | 0 | +B | +B | x | x | x | x | x | x | x | +B | 0 | 0 | +B | +B |
| | CPU2→1 ABNORMAL CONDITION | 0 | 0 | +B | +B | 0 | 0 | +B | +B | 0 | 0 | +B | +B | 0 | 0 | +B | +B |

FIG.17

| FAILURE MODE | | CPU1 | | | | | | | | CPU2 | | | | | | | |
|---|---|---|---|---|---|---|---|---|---|---|---|---|---|---|---|---|---|
| | | POWER RELAY 130 OFF | | POWER RELAY 130 ON | | POWER RELAY 230 OFF | | POWER RELAY 230 ON | | POWER RELAY 130 OFF | | POWER RELAY 130 ON | | POWER RELAY 230 OFF | | POWER RELAY 230 ON | |
| | | V1(a) [A/D] | V1(b) [COMMUNICATION] | V1(a) [A/D] | V1(b) [COMMUNICATION] | V2(a) [COMMUNICATION] | V2(b) [A/D] | V2(a) [COMMUNICATION] | V2(b) [A/D] | V1(a) [COMMUNICATION] | V1(b) [A/D] | V1(a) [COMMUNICATION] | V1(b) [A/D] | V2(a) [A/D] | V2(b) [COMMUNICATION] | V2(a) [A/D] | V2(b) [COMMUNICATION] |
| NORMAL | | 0 | 0 | +B | +B | 0 | 0 | +B | +B | 0 | 0 | +B | +B | 0 | 0 | +B | +B |
| PIG1 POWER SYSTEM | POWER RELAY SHORT | +B | +B | +B | +B | 0 | 0 | +B | +B | +B | +B | +B | +B | 0 | 0 | +B | +B |
| | POWER SYSTEM OPEN, GROUND FAULT | 0 | 0 | 0 | 0 | 0 | 0 | +B | +B | 0 | 0 | 0 | 0 | 0 | 0 | +B | +B |
| POWER SOURCE VOLTAGE DETECTION 140 | FIXED TO +B | +B | 0 | +B | +B | 0 | 0 | +B | +B | 0 | 0 | +B | +B | 0 | 0 | +B | +B |
| | FIXED TO GND | 0 | 0 | 0 | 0 | 0 | 0 | +B | +B | 0 | 0 | +B | +B | 0 | 0 | +B | +B |
| POWER SOURCE VOLTAGE DETECTION 145 | FIXED TO +B | 0 | +B | +B | +B | 0 | 0 | +B | +B | 0 | 0 | +B | +B | 0 | 0 | +B | +B |
| | FIXED TO GND | 0 | 0 | +B | 0 | 0 | 0 | +B | +B | 0 | 0 | +B | +B | 0 | 0 | +B | +B |
| PIG2 POWER SYSTEM | POWER RELAY SHORT | 0 | 0 | +B | +B | +B | +B | +B | +B | 0 | 0 | +B | +B | +B | +B | +B | +B |
| | POWER SYSTEM OPEN, GROUND FAULT | 0 | 0 | +B | +B | 0 | 0 | 0 | 0 | 0 | 0 | +B | +B | 0 | 0 | 0 | 0 |
| POWER SOURCE VOLTAGE DETECTION 240 | FIXED TO +B | 0 | 0 | +B | +B | +B | 0 | +B | +B | 0 | 0 | +B | +B | +B | 0 | +B | +B |
| | FIXED TO GND | 0 | 0 | +B | +B | 0 | 0 | 0 | +B | 0 | 0 | +B | +B | 0 | 0 | +B | +B |
| POWER SOURCE VOLTAGE DETECTION 245 | FIXED TO +B | 0 | 0 | +B | +B | 0 | 0 | +B | +B | 0 | 0 | +B | +B | +B | +B | +B | +B |
| | FIXED TO GND | 0 | 0 | +B | +B | 0 | 0 | +B | +B | 0 | 0 | +B | +B | 0 | 0 | +B | +B |
| COMMUNICATION BETWEEN CPUs | CPU1→2 ABNORMAL CONDITION | 0 | 0 | +B | +B | 0 | 0 | +B | +B | x | x | x | +B | 0 | 0 | 0 | 0 |
| | CPU2→1 ABNORMAL CONDITION | 0 | x | +B | x | x | 0 | x | +B | 0 | 0 | +B | +B | 0 | x | +B | x |

CONTROL APPARATUS OF ROTARY ELECTRIC MACHINE AND ELECTRIC POWER STEERING APPARATUS USING THE SAME

CROSS-REFERENCE TO RELATED APPLICATION

This application is based on and claims the benefit of priority from earlier Japanese Patent Application No. 2016-106190 filed May 27, 2016, the description of which is incorporated herein by reference.

BACKGROUND OF THE INVENTION

Technical Field

The present disclosure relates to a control apparatus of a rotary electric machine and an electric power steering apparatus using the same.

Description of Related Art

Conventionally, a vehicle steering apparatus is known. For example, JP-A-2004-276833 discloses a battery system configured to have a redundant battery, where a battery switching circuit is provided to switch between two batteries. In this battery system, when a malfunction occurs in either one battery, the other battery having no malfunction is connected to the control unit which was powered from the battery where the malfunction occurs.

Even in a case where two power sources each output a voltage within a normal range and no failure has been detected in the power sources, because of degradation of the power source or an increase in a contact resistance or the like, either voltage sometimes decreases. In this case, when two power sources are continuously used, the power source having lower voltage may be further degraded, or overheating may occur at a portion where the contact resistance is increased.

SUMMARY

The present disclosure has been achieved in light of the above-described circumstances, and provides a control apparatus of a rotary electric machine capable of suppressing degradation of the power system, and an electric power steering apparatus using the same.

Hence, it is desired to provide an apparatus for controlling a rotary electric machine provided with a first winding group and a second winding group. The apparatus includes: a first inverter; a second inverter; a first voltage detector; a second voltage detector; a first control unit; and a second control unit.

The first inverter is connected to the first winding group, including a plurality of first switching elements. The second inverter is connected to the second winding group, including a plurality of second switching elements.

The first voltage detector detects a first inverter input voltage entering the first inverter.

The second voltage detector detects a second inverter input voltage entering the second inverter.

The first control unit controls ON/OFF operation of the first switching elements. The second control unit controls ON/OFF operation of the second switching elements.

The first control unit limits a first current command value related to a current flowing through the first winding group, when both of the first inverter input voltage and the second inverter input voltage are normal, and a first differential value, which is obtained by subtracting the first inverter input voltage from the second inverter input voltage, is larger than a determination threshold.

The second control unit limits a second current command value related to a current flowing through the second winding group, when both of the first inverter input voltage and the second inverter input voltage are normal, and a second differential value, which is obtained by subtracting the second inverter input voltage from the first inverter input voltage, is larger than the determination threshold.

Hereinafter, a winding group and components provided for each winding group are referred to as a system.

Also, components including wirings disposed in a conduction path from the power source to the inverter are referred to as a power system.

In the case where the inverter input voltages are in normal condition and its difference exceeds a determination threshold, there may be a degradation of a power system having lower inverter input voltage than that of the other system. According to the present disclosure, the system having lower inverter input voltage is regarded as a system having relatively large power system degradation, and a current command value is limited to reduce an amount of energization. Thus, the power system having lower inverter input voltage can be prevented from being degraded. Further, radiation of heat can be reduced at a portion having large voltage drop in the power system.

BRIEF DESCRIPTION OF THE DRAWINGS

In the accompanying drawings:

FIG. 5 is a table showing a fault determination process according to the first embodiment of the present disclosure;

FIG. 12 is a table showing a fault determination process according to the second embodiment of the present disclosure;

FIG. 17 is a diagram showing a fault determination process according to the third embodiment of the present disclosure;

DETAILED DESCRIPTION OF THE PREFERRED EMBODIMENTS

Hereinafter, with reference to the drawings, a control apparatus of a rotary electric machine and an electric power steering apparatus will be described. In the following description, the same reference signs are applied to substantially the same configurations among a plurality of embodiments, and explanation thereof is omitted.

First Embodiment

A first embodiment of the present disclosure will be illustrated in FIGS. 1 to 9.

Figure 1:
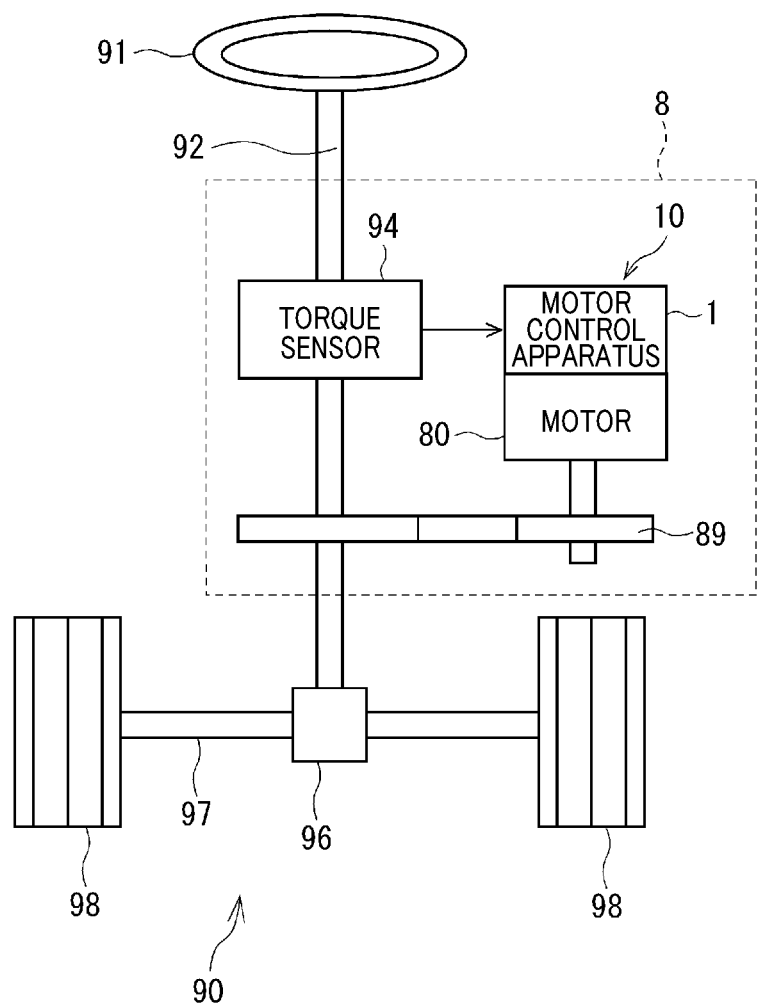
FIG. 1 is an overall configuration of a steering system according to a first embodiment of the present disclosure.

As shown in FIG. 1, a drive apparatus 10 is provided with a motor control unit 1 as a control apparatus of a rotary electric machine and a motor 80 as a rotary electric machine. The drive apparatus 10 of the present embodiment is configured of an integrated body of the motor control unit 1 and the motor 80. However, the motor control unit 1 and the motor 80 may be separated. The drive apparatus 10 is adapted for an electric power steering apparatus 8 that assists steering operation of the driver.

FIG. 1 is a configuration of a steering system 90 provided with the electric power steering apparatus 8. The steering system 90 includes a steering wheel 91 as a steering member, a steering shaft 92, a pinion gear 96, a rack shaft 97, a wheel 98 and the electric power steering apparatus 8.

The steering wheel 91 is connected to the steering shaft 92. In the steering shaft 92, a torque sensor 94 is provided to detect a steering torque transmitted from the steering wheel 91 in response to a driver operation to the steering wheel 91. The torque sensor 94 includes a first sensor 194 and a second sensor 294 (see FIG. 2). At the end portion of the steering shaft 92, a pinion gear 96 is provided to engage with the rack shaft 97. At the both ends of the rack shaft 97, a pair of wheels 98 is connected via a tie rod or the like.

When the driver rotates the steering wheel 91, the steering shaft 92 connected to the steering wheel 91 is rotated. The rotation of the steering shaft 92 is converted into a linear movement of the rack shaft 97 by the pinion gear 96. The pair of wheels 98 is steered at an angle corresponding to a displacement of the rack shaft 97.

The electric power steering apparatus 8 is provided with a motor 80, a reduction gear 89 that reduces rotation of the motor 80 to be transmitted to the steering shaft 92, and motor control unit 1. The electric power steering apparatus 8 according to the present embodiment is configured of a so-called "column assist type", but may be configured of a so-called "rack assist type" where the rotation of the motor 80 is transmitted to the rack shaft 97. In other words, according to the present embodiment, the steering shaft 92 corresponds to a "drive object", but the rack shaft 97 may be a "drive object".

The motor 80 outputs an auxiliary torque that assists the steering operation of the steering wheel 91 of the driver. The motor 80 is driven by being powered from the batteries 105 and 205 (see FIG. 2) as a power source so as to rotate the reduction gear 89 forwardly or reversely.

Figure 2:
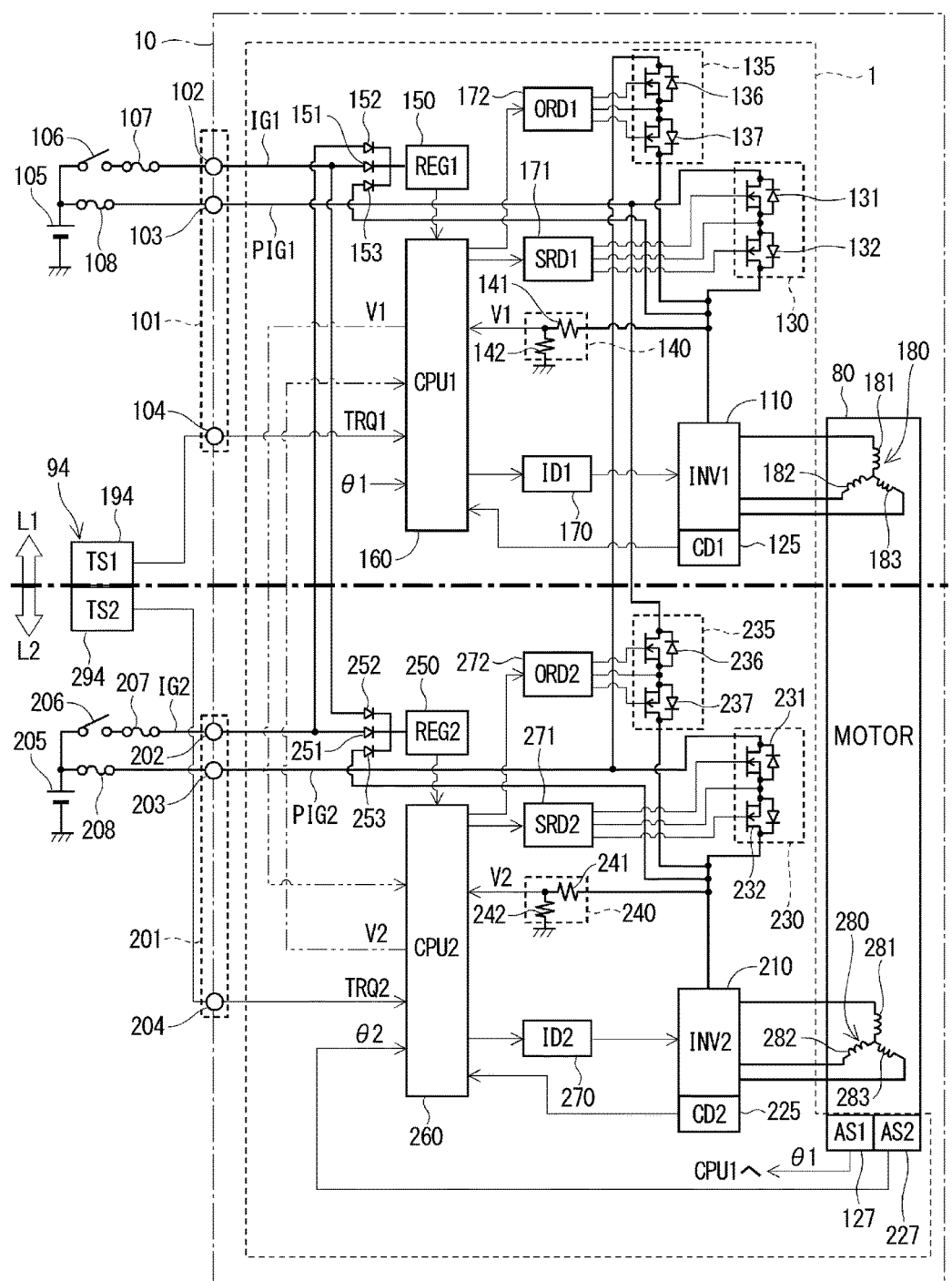
FIG. 2 is a circuit diagram showing a motor control apparatus according to the first embodiment of the present disclosure.
Figure 3:
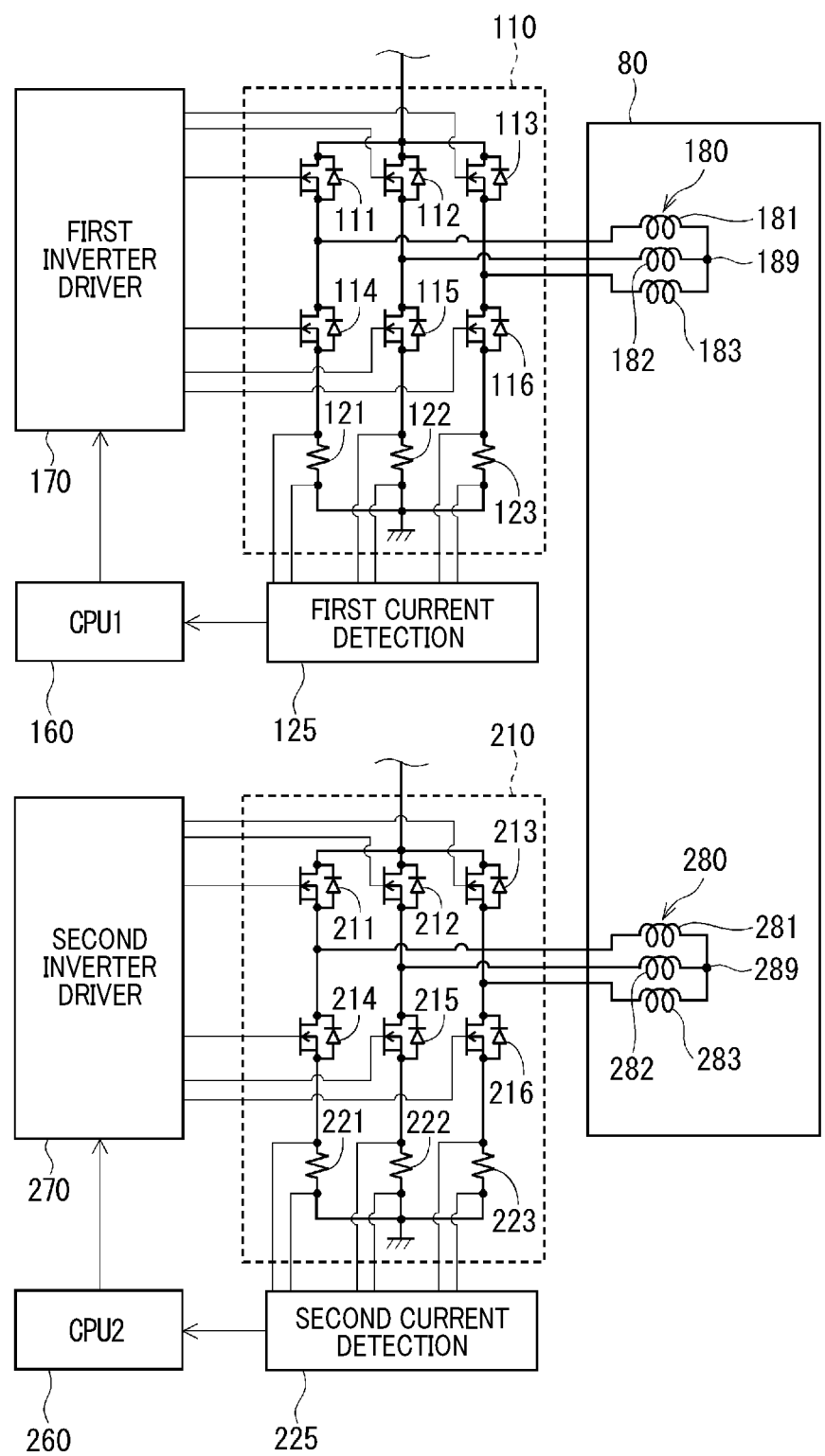
FIG. 3 is a circuit diagram showing a first inverter and a second inverter according to the first embodiment of the present disclosure.

As shown in FIGS. 2 and 3, the motor 80 is configured of a three-phase brushless motor having two winding groups 180 and 280.

The first winding group 180 includes U1 coil 181, V1 coil 182 and W1 coil 183. One end of each of the coils 181, 182 and 183 is connected to a first inverter 110, and other ends of the coils 181, 182 and 183 are connected at the connecting portion 189. The second winding group 280 includes U2 coil 281, V2 coil 282 and W2 coil 283. One end of each of the coils 281, 282 and 283 is connected to a second inverter 210, and other ends of the coils 281, 282 and 283 are connected at the connecting portion 289.

According to the present embodiment, the first inverter 110 and electronic components such as a first control unit 160 are provided for the first winding group 180. Similarly, the second inverter 210 and electronic components such as a second control unit 260 are provided for the second winding group 280. In other words, according to the present embodiment, electronic components of inverters or the like are provided, as a redundant configuration, corresponding to the winding groups 180 and 280. Hereinafter, a combination of the first winding group 180 and components provided for the first winding group 180 is referred to as first system L1, and a combination of the second winding group 280 and components provided for the second winding group 280 is referred to as second system L2.

According to the present specification, 3 digit reference numbers are applied to components corresponding to the first system L1 and the second system L2, in which last 2 digits are common between the first and second systems, and the hundreds place is set to 1 for the first system L1 and set to 2 for the second system L2. For the components related to the first system L1, 'the first' is applied and a suffix '1' is applied to the parameters or the like. Similarly, for the components related to the second system L2, 'the second' is applied and a suffix '2' is applied to the parameters or the like.

Since the first system L1 and the second system L2 are configured to be substantially the same, the first system L1 will be mainly described, and explanation will be suitably omitted for the second system L2.

As shown in FIG. 2, the drive apparatus 10 includes a first connector 101 and a second connector 201.

The first connector 101 is provided with a first IG terminal 102, a first PIG terminal 103, and a first sensor signal terminal 104. The first IG terminal 102 is powered from the first battery 105 via the first switch 106. The first PIG terminal 103 is powered directly from the first battery 105 without transmitting through the first switch 106. The first sensor signal terminal 104 is connected to the first sensor 194 of the torque sensor 94. The first switch 106 is switched between on and off synchronizing to an on-off operation of a starter switch as an ignition switch or the like.

It should be noted that either the first switch 106 or the second switch 206 may be the starter switch itself. A fuse 107 is provided between the first switch 106 and the first IG terminal 102, where the fuse 107 is blown when over current flows therethrough. A fuse 108 is provided between the first battery 105 and the first PIG terminal 103, where the fuse 108 is blown when over current flows therethrough.

The second connector 201 is provided with a second IG terminal 202, a second PIG terminal 203, and a second sensor signal terminal 204. The second IG terminal 202 is powered from the second battery 205 via the second switch 206. The second PIG terminal 203 is powered directly from the second battery 205 without transmitting through the second switch 206. The second sensor signal terminal 204 is connected to the second sensor 294 of the torque sensor 94.

Hereinafter, a wiring from the first battery 105 to the first inverter 110 is referred to as 'first PIG wiring', and a wiring from the second battery 205 to the second inverter 210 is referred to as 'second PIG wiring'. Also, the first PIG wiring and components provided to the first PIG wiring are referred to as 'first PIG power system', and the second PIG wiring and components provided to the second PIG wiring are referred to as 'second PIG power system'. In the PIG power systems, a battery side is defined as an up stream side and an inverter side is defined as a down stream side.

Moreover, a wiring from the first switch 106 to the first control unit power source 150 is defined as a first IG wiring, and a wiring from the second switch 206 to the second control unit power source 250 is defined as a second IG wiring.

The motor control unit 1 is provided with a first inverter 110, a first current detector 125, a first own system power relay 130, a first other system power relay 135, a first voltage detector 140, a first control unit 160, a second inverter 210, a second current detector 225, a second own system power relay 230, a second other system power relay 235, a second voltage detector 240 and a second controller 260.

As shown in FIGS. 2 and 3, the first inverter 110 is configured of a three-phase inverter having first switching elements 111 to 116. The first inverter 110 is powered from the first battery 105 via the first own system power relay 130. When a fault occurs in the first PIG power system, the power can be supplied to the first inverter 110 from the second battery 205 via the first other system power relay 135.

In the first inverter 110, the first switching elements 111 to 113 are connected to high voltage side and the switching elements 114 to 116 are connected to the low voltage side.

A connection point of a pair of U-phase switching elements 111 and 114 is connected to the U1 coil 181. A connection point of a pair of V-phase switching elements 112 and 115 is connected to the V1 coil 182. A connection point of a pair of W-phase switching elements 113 and 116 is connected to the W1 coil 183.

The switching elements 111 to 116 are MOSFET, in which a gate signal is supplied to the gate from the first inverter driver 170. The switching elements 111 to 116 may be configured of IGBTs or thyristors instead of MOSFETs. Other switching elements may be similarly configured.

In the low voltage side of the switching elements 114 to 116 disposed in the low voltage side, shunt resistors 121 to 123 are provided. The voltage across the shunt resistor 121 is outputted to the current detector 125 as a detection value of the first U-phase current Iu1 that flows through the U1 coil 181. The voltage across the shunt resistor 122 is outputted to the current detector 125 as a detection value of the first V-phase current Iv1 that flows through the V1 coil 182. The voltage across the shunt resistor 123 is outputted to the current detector 125 as a detection value of the first W-phase current Iw1 that flows through the W1 coil 183.

The current detector 125 outputs detection values of the phase current Iu1, Iv1 and Iw1 to the first control unit 160. Rotational angle sensors 127 and 227 detect rotational angle of the motor 80.

As shown in FIG. 2, the first own system power relay 130 is disposed at a wiring between the first PIG terminal 103 and the first inverter 110. The first own system power relay 130 includes two switching elements 131 and 132. The switching elements 131 and 132 are connected such that respective parasitic diodes are connected in mutually opposite directions so as to prevent current from flowing in the reverse direction when the first battery 105 is erroneously connected in reverse. The first own system power relay 130 is controlled to be ON, when the motor 80 can be driven by supplying power of the first battery 105 to the first winding group 180.

The first other system power relay 135 is disposed at a wiring which connects between the up stream side of the second own system power relay 230 of the second PIG line and the down stream side of the first own system power relay 130 of the first PIG line. The first other system power relay 135 includes two switching elements 136 and 137. The switching elements 136 and 137 are connected such that respective parasitic diodes are connected in mutually opposite directions so as to prevent current from flowing in the reverse direction when the second battery 205 is erroneously connected in reverse. The first other system power relay 135 is usually turned OFF and turned ON when requiring power to be supplied to the first inverter 110 from the second battery 205, when a fault in the first PIG power system is detected.

The first voltage detector 140 detects voltage of the first PIG line at a down stream side of the first own system power relay 130. The voltage at the first PIG line is referred to as a first inverter input voltage V1. The first voltage detector 140 includes resistors 141 and 142 as a voltage divider which are connected between the first PIG line and the ground. As a detection value relative to the first inverter input voltage V1, the voltage at a connection point between the resistors 141 and 142 is outputted to the first control unit 160.

The first control unit power source 150 is configured of a regulator for example, where power is supplied via the rectifiers 151 to 153. The rectifier 151 is powered through the first IG line, the rectifier 152 is powered through the second IG line, and the rectifier 153 is powered from down stream side of the first own system power relay 130 of the first PIG line. Thus, even when a fault occurs on either system L1 or L2, the first control unit 160 can continue to perform a calculation.

The first controller 160 controls, based on phase current Iu1, Iv1 and Iw1, the first rotational angle θ1 and a first torque TRQ1 or the like, ON/OFF operation of the first switching elements 111 to 116 of the first inverter 110 via the first inverter drive 170. The first rotational angle θ1 is a detection value of the first rotational angle sensor 127, and the first torque TRQ1 is a detection value of the first sensor 194 of the torque sensor 94. Thus, the first control unit 160 controls energization of the first winding group 180, thereby controlling the motor 80.

The first control unit 160 performs ON-OFF control of the first own system power relay 130 via the first own system relay drive 171, and performs ON-OFF control of the first other system power relay 135 via the first other system relay driver 172.

For the second system L2, a connection relationship will mainly be described.

The second inverter 210 is three-phase inverter having second switching elements 211 to 216. The second inverter 210 is powered by the second battery 205 via the second own power relay 230. Even when a fault occurs in the second PIG power system, the second inverter 210 can be powered from the first battery 105 via the second other system power relay 235.

A voltage across each of the shunt resistors 221 to 223 are outputted to the current detectors 225, as the detection values corresponding to the phase current Iu2, Iv2 and Iw2 respectively.

The current detector 225 outputs the detection values of the phase current Iu2, Iv2, and Iw2 to the second control unit 260.

The second own system power relay 230 is disposed at a wiring that connects the second PIG terminal 203 and the second inverter 210, and turned ON when the motor 80 is capable of being driven by supplying power of the second battery 205 to the second winding group 280.

The second other system power relay 235 is disposed at a wiring that connects up stream side of the first own system power relay 130 of the first PIG line and down stream side of the second own system power relay 230 of the second PIG line. The second other system power relay 235 is usually turned OFF, and turned ON when a fault occurs in the second PIG power system and the second inverter 210 has to be powered from the first battery 105.

The second voltage detector 240 detects voltage of the second PIG line at the down stream side of the second own system power relay 230. As a detection value relative to the second inverter input voltage V2, voltage at the connection point of the resistors 241 and 242, which is the voltage divider, is outputted to the second control unit 260.

The second control unit power source 250 is configured of a regulator, for example, and is powered via the rectifiers 251 to 253. The rectifier 251 is powered through the second IG line. The rectifier 252 is powered through the first IG line. The rectifier 253 is powered from down stream side of the second own power relay 230 of the second PIG line. Thus, even when a fault occurs in either system L1 or system L2, the second control unit 260 can continue to perform a calculation.

Since detailed function of components that configure the second system L2 is similar to the first system L1, the explanation thereof will be omitted.

In the drawings, the inverter, the current detector, power source of the controller (e.g., configured as regulator), the control unit, the inverter driver, the own system relay driver, the other system relay driver, the rotational angle sensor and the torque sensor are referred to as INV, CD, REG, CPU, ID, SRD, ORD, AS, TS respectively, in which suffix 1 or 2 representing the system is added thereto.

In the drawings, the first rotation sensor 127 is related to the first system L1, but is described in the second system L2 side for convenience of an arrangement.

Figure 4:
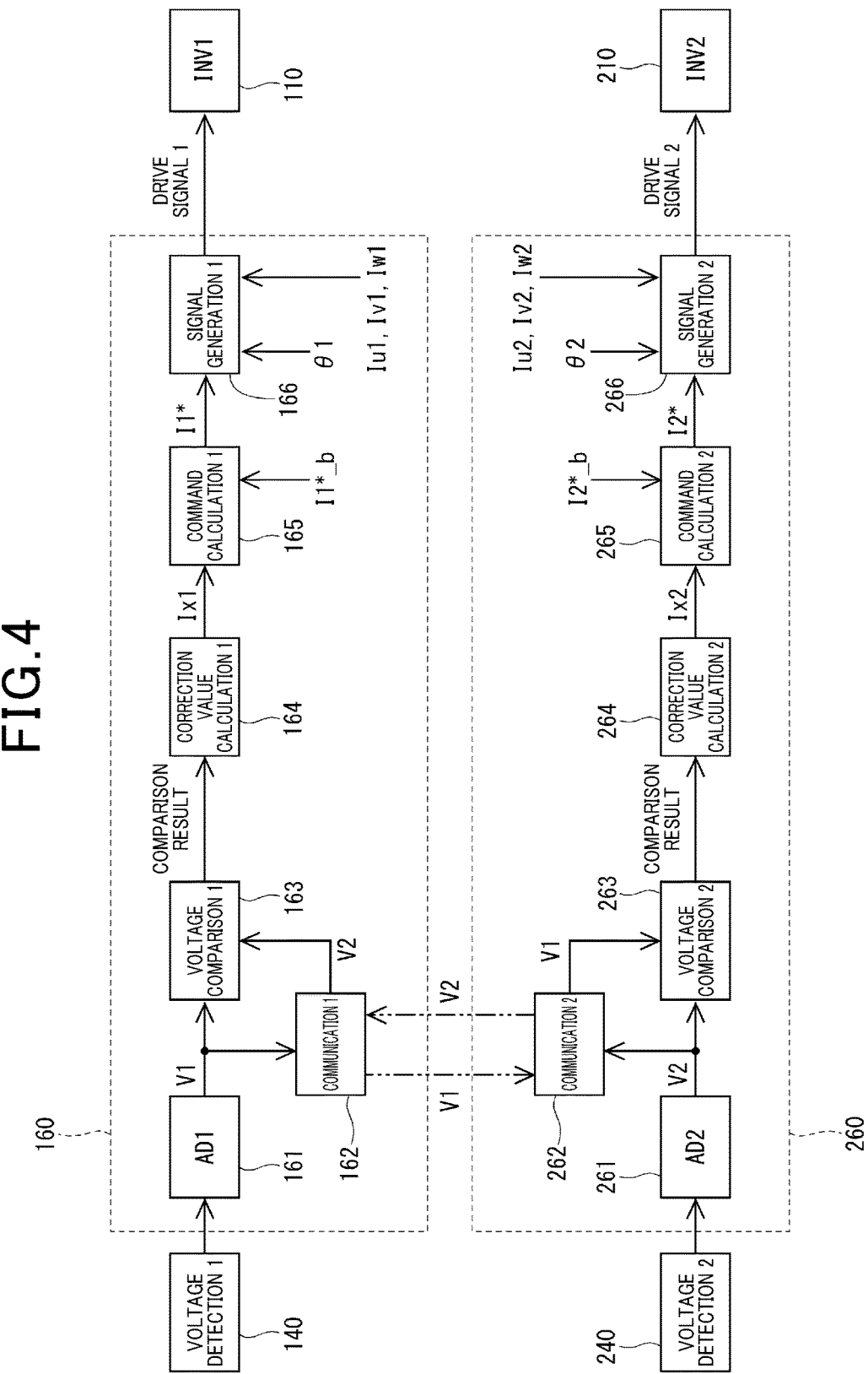
FIG. 4 is a block diagram showing a first control unit and a second control unit according to the first embodiment of the present disclosure.

As shown in FIG. 4, the first control unit 160 is provided with a first AD conversion unit 161, a first communication unit 162, a first voltage comparison unit 163, a first correction calculation unit 164, a first command calculating unit 165 and a first signal generation unit 166 or the like.

The second control unit 260 is provided with a second AD converter 261, a second communication unit 262, a second voltage comparison unit 263, a second correction calculation unit 264, a second command calculation unit 265 and a second signal generation unit 266 or the like.

The first AD conversion unit 161 performs an AD conversion of the first inverter input voltage V1 detected by the first voltage detector 140. The second AD conversion unit 261 performs an AD conversion of the second inverter input voltage V2 detected by the second voltage detector 240. Hereinafter, post AD conversion value is simply referred to as inverter voltages V1 and V2.

The first communication unit 162 transmits the first inverter input voltage V1 to the second communication unit 262 and receives the second inverter input voltage V2 from the second communication unit 262. The second communication unit 262 transmits the second inverter input voltage V2 to the first communication unit 162 and receives the first inverter input voltage V1 from the first communication unit 162. In the drawing, the communication lines are shown with a two-dot chain line.

The voltage comparison units 163 and 263 are each configured to compare the first inverter input voltage V1 and the second inverter input voltage V2. The first correction calculation unit 164 calculates the first correction value Ix1, based on the comparison result of the first inverter input voltage V1 and the second inverter input voltage V2. The second correction calculation unit 264 calculates the second correction value Ix2, based on the comparison result of the first inverter input voltage V1 and the second inverter input voltage V2.

The first command calculating unit 165 calibrates, using the first correction value Ix1, the first basic command value I1*_b calculated based on a torque command value or the like, thereby calculating a first current command value I1*. The second command calculating unit 265 calibrates, using the second correction value Ix2, the second basic command value I2*_b calculated based on a torque command value or the like, thereby calculating a second current command value I2*. According to the first embodiment, the first basic command value I1*_b and the second basic command value I2*_b are calculated based on torque command value or the like, for example. According to the first embodiment, the basic command value I1*_b and I2*_b are the same value, but different values may be used.

The first signal generation unit 166 generates a first drive signal based on the first current command value I1*, the first rotational angle θ1, the phase current Iu1, Iv1 and Iw1. The first inverter 110 is controlled based on the first drive signal.

The second signal generation unit 266 generates a second drive signal based on the second current command value I2*, the second rotational angle θ2, the phase current Iu2, Iv2 and Iw2. The second inverter 210 is controlled based on the second drive signal.

It should be noted that the inverter drivers 170 and 270 are not shown in FIG. 4.

A fault determination procedure of the first embodiment will be described with reference to FIG. 5. In FIG. 5, +B refers to the battery voltage, and x refers to a state where values cannot be obtained, in which portions having different values from the normal state are shown in shadow pattern. Also, columns labeled as [A/D] in the table have values directly obtained from the AD conversion unit, and columns labeled as [Communication] have values transmitted from the control unit of the other system. In FIGS. 12 and 17, columns labeled as [A/D] and columns labeled as [Communication] are similar to FIG. 5. The fault determination procedure of FIG. 5 is executed by each of the voltage comparison units 163 and 263. An abnormality determination unit may be provided other than the voltage comparison unit 163 and 263. The fault determination procedure determines whether or not a short failure exists in the own system power relays 130 and 230, as an initial check procedure when the starter switch is turned ON, before turning ON the own system power relays 130 and 230. When no short failures exist in the relays 130 and 230, the process turns the relays 130 and 230 ON and determines whether or not there are failures in the PIG power system, open failures of relays 130 and 230, and communication failures.

When the first own system power relay 130 is turned OFF, the first inverter input voltage V1 becomes 0 when there are no failures. When it is assumed that a short failure exists in which the first own system power relay 130 is unable to cutoff, or the detection value of the first voltage detection unit 140 is fixed to the battery voltage, the first inverter input voltage V1 detected by the control units 160 and 260 becomes battery voltage +B. According to the first embodiment, the process determines that a fault has occurred when the first inverter input voltage V1 exceeds the short determination threshold VSth.

When the first own system power relay 130 is turned ON, the first inverter input voltage V1 detected by the control units 160 and 260 becomes the battery voltage +B, when there are no failures. In the case where the first PIG wiring is broken or shorted to the ground, an open failure has occurred causing a conduction failure in the first own system power relay 130, or the detection value of the first voltage detection unit 140 is fixed to the ground, the first inverter voltage V1 obtained by the control units 160 and 260 become 0. According to the first embodiment, considering an over voltage failure, the process determines that a fault has occurred when the first inverter voltage V1 is lower than the normal lower limit VL or larger than the normal upper limit VH.

When the second own system power relay 230 is turned OFF, the second inverter input voltage V2 detected by the control units 160 and 260 becomes 0. In the case where a short failure has occurred in the second own system power relay 230 or the detection value of the second voltage detection unit 240 is fixed to the battery voltage, the second inverter input voltage V2 detected by the control units 160 and 260 becomes battery voltage +B. The process determines that a fault has occurred when the second inverter input voltage V2 exceeds the short determination threshold VSth.

When the second own system power relay 230 is turned ON, the second inverter input voltage V2 detected by the control units 160 and 260 becomes the battery voltage +B, when there are no failures. In the case where the second PIG wiring is broken or shorted to the ground, or an open failure has occurred in the second own system power relay 230, or the detection value of the second voltage detection unit 240 is fixed to the ground, the second inverter voltages V2 obtained by the control units 160 and 260 become 0. According to the first embodiment, the process determines that a fault has occurred when the second inverter voltage V2 is lower than the normal lower limit VL or larger than the normal upper limit VH. When any of these failures has occurred, a fault procedure of power system failure is executed. Hereinafter, a range from the normal lower limit VL to the normal upper value VH is defined as a normal range. A normal operation is defined in the case where the inverter input voltages V1 and V2 are in the normal range, and an abnormal operation is defined in the case where the input voltages V1 and V2 are out of the normal range.

When the first control unit 160 cannot detect the second inverter input voltage V2, it is determined that a communication failure has occurred between the second control unit 260 and the first control unit 160. When the second control unit 260 cannot detect the first inverter input voltage V1, it is determined that a communication failure has occurred between the first control unit 160 and the second control unit 260. When a communication failure has occurred, a current limiting control (will be described later) cannot be performed. However, in each system, a normal control can be performed.

A motor control process of the first embodiment will be described with reference to the flowchart shown in FIGS. 6 and 7.

Figure 6:
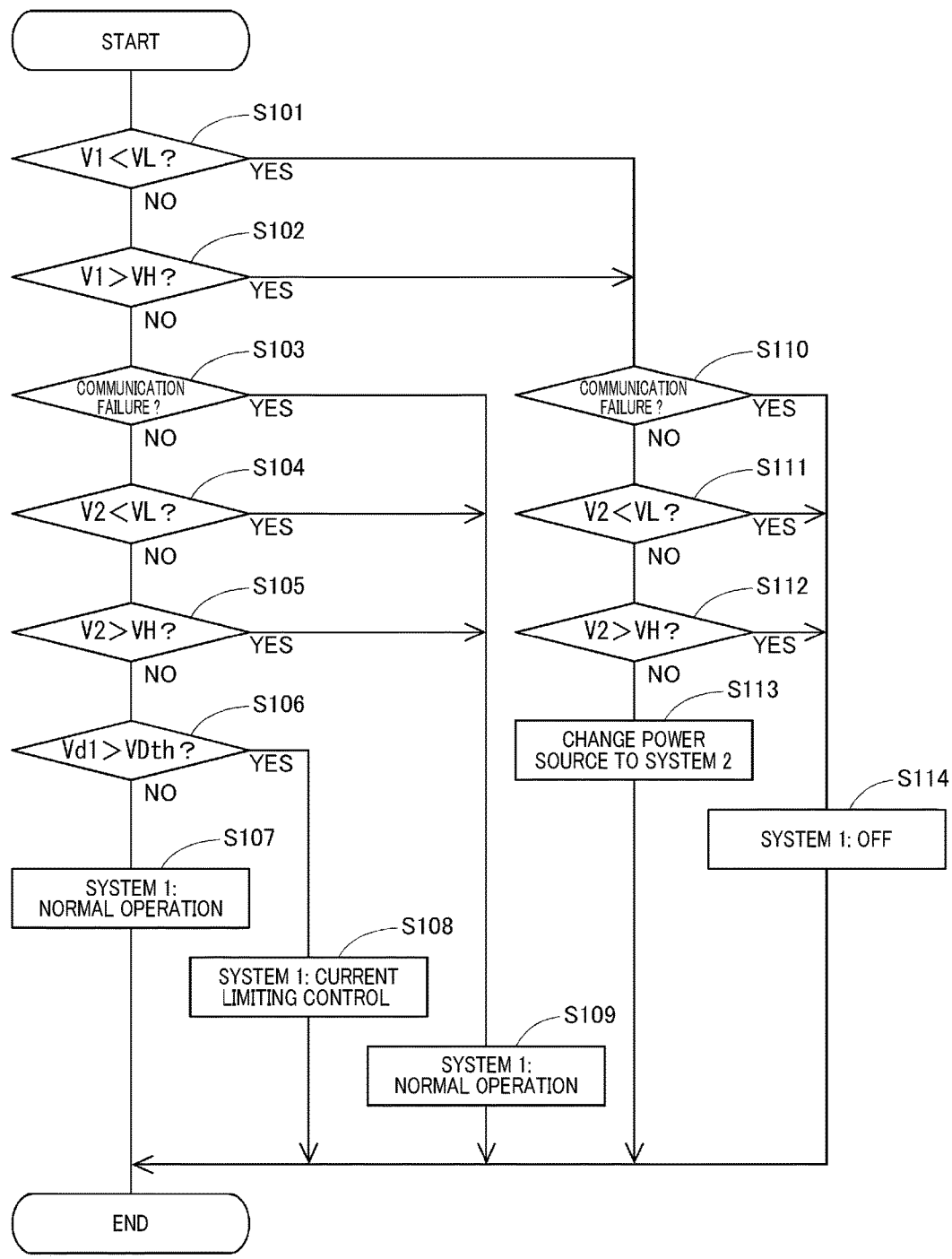
FIG. 6 is a flowchart showing a motor control process in the first control unit according to the first embodiment of the present disclosure.

FIG. 6 illustrates a process related to the first system L1 which is executed by the first control unit 160. FIG. 7 illustrates a process related to the second system L2 executed by the second control unit 260. Hereinafter, for step S101, 'step' is omitted and simply abbreviated to the sign '5', and other steps are also abbreviated with the sign 'S'. The motor control process shown in FIGS. 6 and 7 is executed at a predetermined periods when no short failures have occurred in the own system power relays 130 and 230 and the relays 130 and 230 are turned ON. It is assumed that the other system power relays 135 and 235 have been determined as in a normal operation as a result of a fault determination.

As shown in FIG. 6, at the first step S101, the first voltage comparison unit 163 determines whether or not the first inverter input voltage V1 is lower than the normal lower limit VL. When it is determined that the first inverter input voltage V1 is lower than the normal lower limit VL (S101: YES), the process proceeds to S110. When it is determined that the first inverter input voltage V1 is larger than or equal to the normal lower limit VL (S101: NO), the process proceeds to S102.

At S102, the first voltage comparison unit 163 determines whether or not the first inverter input voltage V1 is larger than the normal upper limit VH. When it is determined that the first inverter input voltage V1 is larger than the normal upper limit VH (S102: YES), the process proceeds to S110, and when it is determined that the first inverter input voltage V1 is lower than or equal to the normal upper limit VH (S102: NO), the process proceeds to S103.

At S103, the first voltage comparison unit 163 determines whether or not a communication error has occurred between the first voltage comparison unit 163 and the second control unit 260. The first voltage comparison unit 163 recognizes that a communication error has occurred when the second inverter input voltage V2 cannot be obtained. When it is determined that the communication error has occurred (S103: YES), the process proceeds to S109. When it is determined that the communication error has not occurred (S103: NO), the process proceeds to S104.

At S104, the first voltage comparison unit 163 determines whether or not the second inverter input voltage V2 is lower than the normal lower limit VL. When it is determined that the second inverter input voltage V2 is lower than the normal lower limit VL (S104: YES), the process proceeds to S109. When it is determined that the second inverter input voltage V2 is larger than or equal to the normal lower limit VL (S104: NO), the process proceeds to S105.

At S105, the first voltage comparison unit 163 determines whether or not the second inverter input voltage V2 is larger than the normal upper limit VH. When it is determined that the second inverter input voltage V2 is larger than the normal upper limit VH (S105: YES), the process proceeds to S109. When it is determined the second inverter input voltage V2 is lower than or equal to the normal upper limit VH (S105: NO), the process proceeds to S106.

At S106, the first voltage comparison unit 163 determines whether or not a first differential value Vd1 is larger than a determination threshold VDth. The determination threshold VDth is set such that its value is acceptable as a system error. The first differential value Vd1 is obtained by subtracting the first inverter input voltage V1 from the second inverter input voltage V2 (See equation (1)).

$$Vd1 = V2 - V1 \quad (1)$$

When it is determined that the first differential value Vd1 is larger than the determination threshold value VDth (S106: YES), the process proceeds to S108. When it is determined that the first differential value Vd1 is lower than the determination threshold VDth (S106: NO), the process proceeds to S107.

S107 is executed when both of the first inverter input voltage V1 and the second inverter input voltage V2 are in normal state and the first inverter input voltage V1 is larger than or equal to the second inverter input voltage V2 (i.e., V1≥V2), or the second inverter input voltage V2 is larger than the first inverter input voltage V1, and those difference, that is, the first differential value Vd1 is lower than or equal to the determination threshold VDth. In S107, the first control unit 160 sets the first system L1 to be under a normal control. Specifically, the first correction calculation unit 164 sets the first correction value Ix1 to be 0, and the first command calculating unit 165 sets the first basic command value I1*_b to be the first current command value I1*

S 108 is executed when both of the first inverter input voltage V1 and the second inverter input voltage V2 are in normal state and the first inverter input voltage V1 is lower than the second inverter input voltage V2 (i.e., V1<V2), and those difference, that is, the first differential value Vd1 is larger than the determination threshold VDth. In S108, the first control unit 160 sets the first system L1 to be under a current limiting control. Specifically, the first correction calculation unit 164 calculates the first correction value Ix1 based on the first differential value Vd1. Also, the first command calculation unit 165 calculates the first current command value I1* which is corrected in negative side (i.e., negative correction), by subtracting the first correction value Ix1 from the first basic command value I1*_b.

Figure 8:
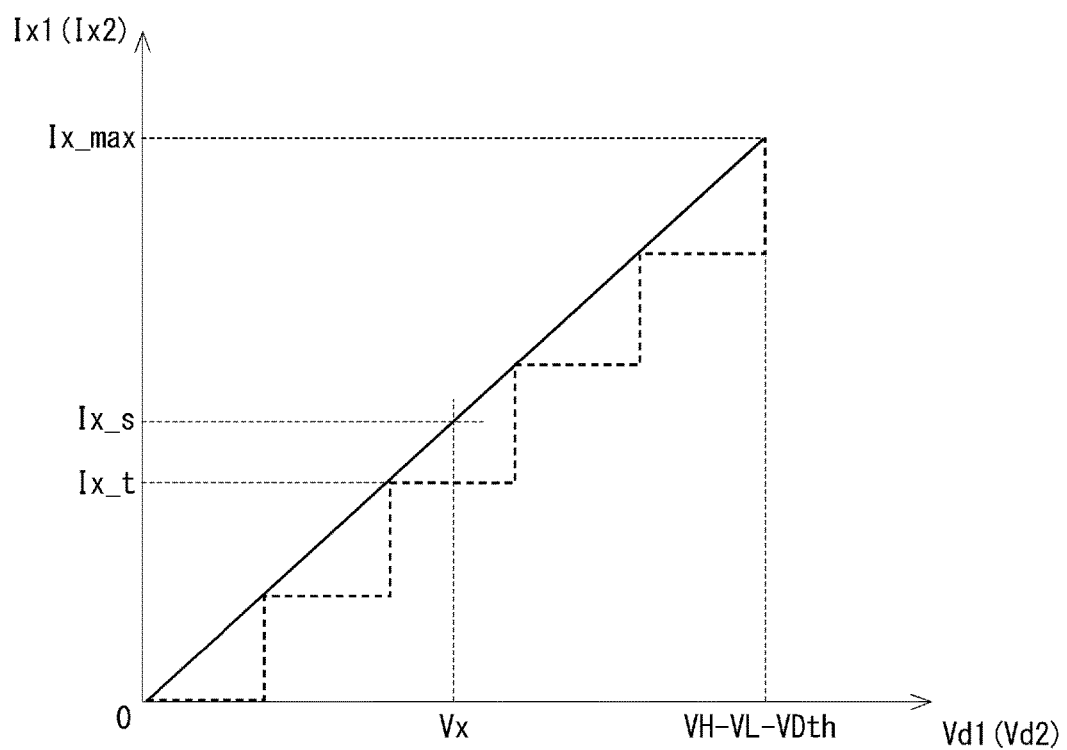
FIG. 8 is an explanatory diagram showing a calculation of a correction value according to the first embodiment of the present disclosure.

The first correction value Ix1 is calculated based on a map shown in FIG. 8, for example. In FIG. 8, the horizontal axis represents the first differential value Vd1 and the vertical axis represents the first correction value Ix1. The first correction value Ix1 is mapped in FIG. 8 such that the larger the current differential value Vd1, the larger the first correction value Ix1. Moreover, the first correction value Ix1 is the maximum correction value Ix_max, when the current differential value Vd1 is expressed by equation (2) as follows.

$$Vd1 = VH - VL - VDth \quad (2)$$

For example, in the map used for calculating the first correction value Ix1, as illustrated with a solid line, linear interpolation may be performed between the origin and the maxim correction value Ix_max. At this time, when the first differential value Vd1 is Vx, the first correction value Ix1 becomes Ix_s.

Also, in the map used for calculating the first correction value Ix1, as illustrated with a dotted line, the first correction value Ix1 may be increased stepwise as the first differential value Vd1 increases. In the case where the first difference value Vd1 is Vx, the first correction value Ix1 is Ix_t.

It should be noted that the map illustrating the calculation of the first correction value Ix1 is not limited to the one shown in FIG. 8, any other maps may be used. Alternatively, by using functions or the like, the first correction value Ix1 may be calculated based on the first differential value Vd1.

The second correction value Ix2 is calculated similar to the first correction value Ix1, by replacing the first differential value Vd1 for the second differential value Vd2.

Referring back to FIG. 6, at S109 which is executed when the first inverter input voltage V1 is normal (S101: NO and S102: NO) and a communication error has occurred (S103: YES), or the second inverter input voltage is in an abnormal condition (S104: YES, or S105: YES), the first control unit 160 sets the first system L1 to be under a normal control. In other words, when a communication error has occurred and the second inverter input voltage V2 is in an abnormal condition, the first control unit 160 does not perform the current limiting control which is activated depending on a comparison between voltages of the two systems.

The processes of S110 to S112 executed when the first inverter input voltage V1 is in an abnormal condition (S101: YES, or S102: YES) are similar to the processes of S103 to S105. When a communication error has occurred (S110: YES), or the second inverter voltage V2 is in an abnormal condition (S111: YES or S112: YES), the process proceeds to S114. When a communication error has not occurred (S110: NO) and the second inverter input voltage V2 is in a normal condition (S111: No and S112: NO), the process proceeds to S113.

S113 is executed when the first inverter input voltage V1 is in an abnormal condition (S101: YES or S102: YES), and the second inverter input voltage V2 is in normal condition (S111: NO and S112: NO). At S113, the first control unit 160 changes the source of a power supplied to the first inverter 110 to be the second system L2. Specifically, the first control unit 160 turns the first own system power relay 130 OFF and turns the first other system power relay 135 ON. After proceeding to S113, the process proceeds to a fail-safe operation process separately from the present process and maintains the driving of the motor 80.

S114 is executed when both of the inverter input voltages V1 and V2 are in an abnormal condition (S101: YES or S102: YES, and S110: YES or S111: YES or S112: YES), and stops driving the motor 80. At S114, the first control unit 160 disables operation of the first system L1. In other words, the first control unit 160 turns the power relays 130 and 135 OFF.

Figure 7:
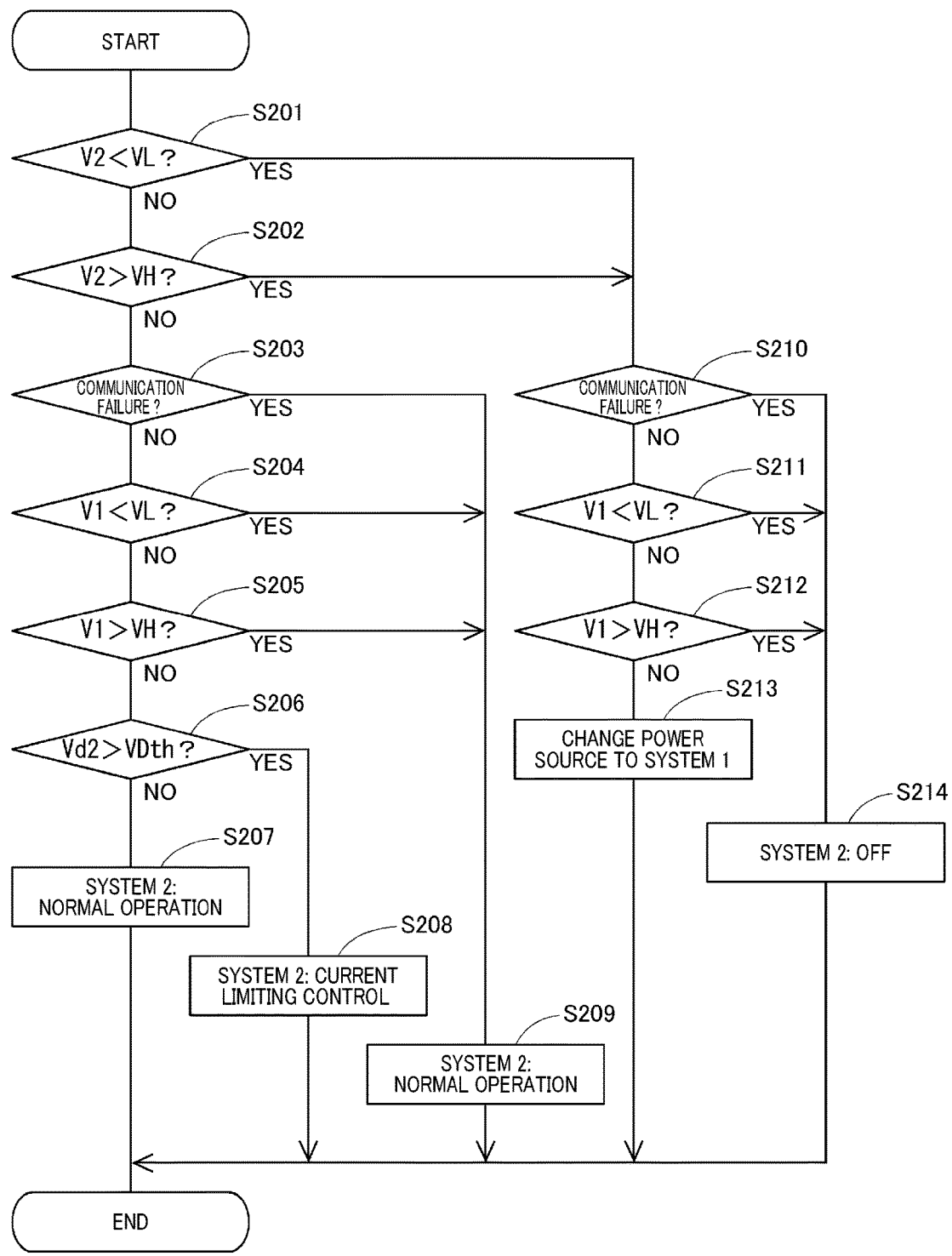
FIG. 7 is a flowchart showing a motor control process in the second control unit according to the first embodiment of the present disclosure.

As shown in FIG. 7, at S201 and S202, the second voltage comparison unit 263 performs determination processes similar to steps S104 and S105 shown in FIG. 6. When the process determines that the second inverter input voltage V2 is lower than the normal lower limit VL (S201: YES) or the second inverter input voltage V2 is larger than the normal upper limit VH (S202: YES), the process proceeds to S210. When the process determines that the second inverter input voltage V2 is larger than or equal to the normal lower limit VL, and lower than or equal to the normal upper limit VH (S201: NO and S202: NO), the process proceeds to S203.

At S203, the second voltage comparison unit 263 determines whether or not a communication error has occurred between the second voltage comparison unit 263 and the first control unit 160. The second voltage comparison unit 263 recognizes that a communication error has occurred when the first inverter input voltage V1 cannot be acquired. When it is determined that a communication error has occurred (S203: YES), the process proceeds to S209. When the process determines that no communication error has occurred (S203: NO), the process proceeds to S204.

At S204 and S205, the second voltage comparison unit 263 performs processes similar to S101 and S102 shown in FIG. 6. When the process determines that the first inverter input voltage V1 is lower than the normal lower limit VL (S204: YES), or the first inverter input voltage V1 is larger than the normal upper limit VH (S205: YES), the process proceeds to S209. When the process determines that the first inverter input voltage V1 is larger than or equal to the normal lower limit VL, and lower than or equal to the normal upper limit VH (S204: NO and S205: NO), the process proceeds to S206.

At S206, the second voltage comparison unit 263 determines whether or not the second differential value Vd2 is larger than the determination threshold VDth. The second differential value Vd2 is obtained by subtracting the second inverter input voltage V2 from the first inverter input voltage V1 (see equation (3)).

$$Vd2=V1-V2 \qquad (3)$$

When the process determines that the second differential value Vd2 is larger than the determination threshold VDth (S206: YES), the process proceeds to S208. When the process determines that the second differential value VD2 is lower than or equal to the determination threshold VDth (S206: NO), the process proceeds to S207.

S 207 is executed when both of the first inverter input voltage V1 and the second inverter input voltage V2 are in normal state and the second inverter input voltage V2 is larger than or equal to the first inverter input voltage V1 (i.e., V2≥V1), or the first inverter input voltage V1 is larger than the second inverter input voltage V2, and those difference, that is, the second differential value Vd2 is lower than or equal to the determination threshold VDth. In S207, the second control unit 260 sets the second system L2 to be under normal control. Specifically, the second correction calculation unit 264 sets the second correction value Ix2 to be 0, and the second command calculating unit 265 sets the second basic command value I2*_b to be the second current command value I2*.

S 208 is executed when both of the first inverter input voltage V1 and the second inverter input voltage V2 are in a normal state and the second inverter input voltage V2 is lower than the first inverter input voltage V1 (i.e., V2<V1), and those difference, that is, the second differential value Vd2 is larger than the determination threshold VDth. In S208, the second control unit 260 sets the second system L2 to be under a current limiting control. Specifically, the second correction calculation unit 264 calculates the second correction value Ix2 based on the second differential value Vd2. Also, the second command calculation unit 265 calculates the second current command value I2* which is corrected in negative side, by subtracting the second correction value Ix2 from the second basic command value I2*.

At S209 executed when the second inverter input voltage V2 is in normal state (S201: NO and S202: NO) and a communication error has occurred (S203: YES), or the first inverter input voltage V1 is in an abnormal state (S204: YES or S205: YES), the second control unit 260 sets the second system L2 to be under normal control. In other words, when a communication error has occurred and the first inverter input voltage V1 is in an abnormal condition, the second control unit 260 does not perform the current limiting control which is activated depending on a comparison between voltages of the two systems.

The processes S210 to S212 executed when the second inverter input voltage V2 is in an abnormal condition (S201: YES or S202: YES) are similar to the processes of S203 to S205. When a communication error has occurred (S210: YES), or the first inverter input voltage V1 is in an abnormal condition (S211: YES or S212: YES), the process proceeds to S214. When no communication error has occurred (S210: NO) and the first inverter input voltage V1 is in a normal condition (S211: NO and S212: NO), the process proceeds to S213.

S213 is executed when the second inverter input voltage V2 is in an abnormal condition (S201: YES or S202: YES), and the first inverter input voltage V1 is in a normal condition (S210:NO and S211:NO). At S213, the second control unit 260 changes the source of a power supplied to the second inverter 210 to be from the first system L1. Specifically, the second control unit 260 turns the second own system power relay 230 OFF, and turns the second other system power relay 235 ON. After proceeding to S213, the process proceeds to a fail-safe operation process separately from the present process and maintains the driving of the motor 80.

S214 is executed when both of the inverter input voltages V1 and V2 are in an abnormal condition (S201: YES or S202: YES, and S211: YES or S212: YES) and stops driving the motor 80. At S214, the second control unit 260 disables operation of the second system L2. In other words, the second control unit 260 turns the power relays 230 and 235 OFF.

Figure 9:
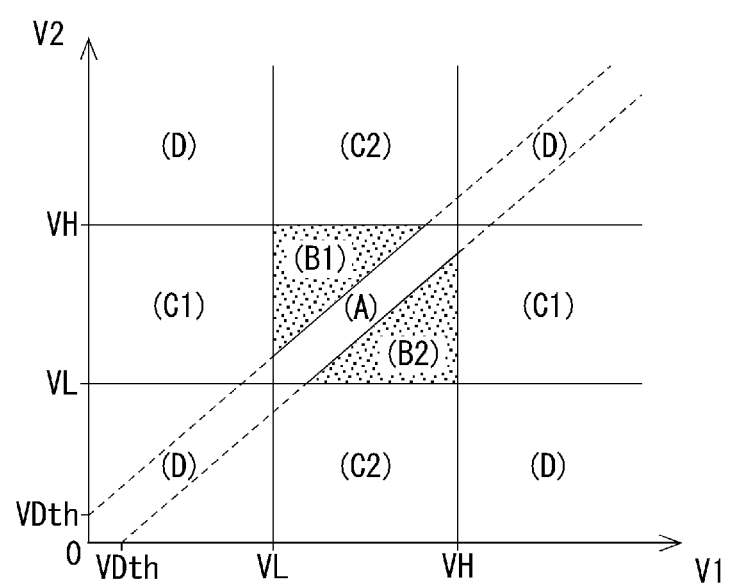
FIG. 9 is a diagram showing a control map according to the first embodiment of the present disclosure.

A control map of the first embodiment is shown in FIG. 9. It is assumed that no communication error has occurred.

The region A illustrated in FIG. 9 corresponds to processes of S107 and S207, in which both of the inverter input voltages V1 and V2 are in normal condition and the difference thereof are lower than or equal to the determination threshold VDth. In the region A, both systems L1 and L2 are under the normal control.

The region B1 corresponds to the processes of S108 and S207, in which both of the inverter input voltages V1 and V2 are in normal condition and the first differential value Vd1 is larger than the determination threshold VDth. In the region B1, the current limiting control is applied to the first system L1 and the normal control is applied to the second system L2. The region B2 corresponds to the processes of S107 and S208, in which both of the inverter input voltages V1 and V2 are in normal condition and the second differential value Vd2 is larger than the determination threshold VDth. In the region B2, normal control is applied to the first system L1 and the current limiting control is applied to the second system L2. In FIG. 9, a region corresponding to the current limiting control is shown in shadowed.

In the case where the battery 105 or 205 is degraded, or a wiring resistance of the PIG wiring increases, the inverter input voltages V1 and V2 are lowered. Also, degradation advances differently between the systems. In these circumstances, when controlling the both systems in the same manner, it may shorten the life of a battery in the degraded system, or may produce an excessive heat at a portion where the resistance has increased.

In this respect, according to the first embodiment, it is assumed that a system having smaller inverter input voltage V1 or V2 than that of the other system has a relatively large degree of degradation, and the current limiting control is applied to the system having the smaller inverter input voltages. Thus, a battery in the system having larger degree of degradation can be prevented from being degraded. Also, excessive heat can be prevented from being produced at the portion where the resistance is increased.

The region C1 corresponds to processes of S113 and S209, in which the first inverter input voltage V1 is in an abnormal condition, and the second inverter input voltage V2 is in a normal condition. In the region C1, the first own system power relay 130 is set to be OFF and the first other system power relay 135 is set to be ON so as to switch the power source of the first system L1 to the second battery 205, whereby both systems L1 and L2 are powered from the second battery 205.

The region C2 corresponds to S109 and S213, in which the first inverter input voltage V1 is in a normal condition, and the second inverter input voltage V2 is in an abnormal condition. In the region C2, the second own system power relay 230 is set to be OFF and the second system power relay 235 is set to be ON so as to switch the power source of the second system L2 to the first battery 105, whereby both systems L1 and L2 are powered from the first battery 105. Thus, even if a failure occurs in one PIG power system, the power source can be switched to one power system being in the normal condition, whereby the two systems still keep operating (driving) so that similar controllability can be maintained similar to the normal operation.

The region D corresponds to processes of S114 and S214, in which both of the inverter input voltages V1 and V2 are in an abnormal condition. In the region D, the systems L1 and L2 are disabled and driving of the motor 80 is stopped.

As described, the motor control unit 1 controls the motor 80 which is provided with the first winding group 180 and the second winding group 280. The motor control unit 1 is provided with the first inverter 110, the second inverter 210, the first voltage detector 140, the second voltage detector 240, the first control unit 160 and the second control unit 260.

The first inverter 110 includes a plurality of first switching elements 111 to 116 which are connected to the first winding group 180.

The second inverter 210 includes a plurality of second switching elements 211 to 216 which are connected to the second winding group 280.

The first voltage detector 140 detects the first inverter input voltage V1 supplied to the first inverter 110.

The second voltage detector 240 detects the second inverter input voltage V2 supplied to the second inverter 210.

The first control unit 160 controls ON/OFF operation of the first switching elements 111 to 116.

The second control unit 260 controls ON/OFF operation of the second switching elements 211 to 216.

The first control unit 160 limits the first current command value I1* related to a current flowing through the first winding group 180, when both of the first inverter input voltage V1 and the second inverter input voltage V2 are normal, and the first differential value Vd1, which is obtained by subtracting the first inverter input voltage V1 from the second inverter input voltage V2, is larger than a determination threshold VDth.

The second control unit 260 limits the second current command value I2* related to a current flowing through the second winding group 280, when both of the first inverter input voltage V1 and the second inverter input voltage V2 are normal, and the second differential value Vd2, which is obtained by subtracting the second inverter input voltage V2 from the first inverter input voltage V1, is larger than the determination threshold VDth.

When the inverter input voltages V1 and V2 are in the normal condition and the difference thereof is larger than the determination threshold VDth, it may cause a degradation of the lower side power system. In this respect, according to the first embodiment, it is assumed that a system having smaller inverter input voltage V1 or V2 than that of the other system has relatively large degree of degradation, and the current command values I1* and I2* are limited so as to reduce an amount of energization. Thus, a degradation of the system having smaller inverter input voltage can be suppressed. Further, excessive heat produced at a portion having a large voltage drop in the power system can be reduced.

The first control unit 160 uses the first correction value Ix1 calculated based on the first differential value Vd1 to perform a negative-correction of the first basic command value I1*_b, thereby limiting the first current command value I1*.

The second control unit 260 uses the second correction value Ix2 calculated based on the second differential value Vd2 to perform a negative-correction of the second basic command value I2*_b, thereby limiting the second current command value I2*.

Thus, the current command values I1* and I2* can be appropriately limited based on the differential values Vd1 and Vd2.

The first inverter input voltage V1 is outputted to the first control unit 160, and transmitted to the second control unit 260 from the first control unit 160 via a communication line.

The second inverter input voltage V2 is outputted to the second control unit 260, and transmitted to the first control unit 160 from the second control unit 260 via a communication line.

Thus, each of the control units 160 and 260 may utilize either of the inverter input voltages V1 and V2.

The motor control unit 1 is provided with the first own system power relay 130, the second own system power relay 230, the first other system power relay 135 and the second other system power relay 235.

The first own system power relay 130 is provided between the first PIG terminal 103 of the first connector 101 and the first inverter 110.

The second own system power relay 230 is provided between the second PIG terminal 203 of the second connector 201 and the second inverter 210.

The first other system power relay 135 is disposed at a wiring which connects between a second connector 201 side of the second own system power relay 230 and the first inverter 110 side of the first own system side power relay 130.

The second other system power relay 235 is disposed at a wiring which connects between a first connector 101 side of the first own system power relay 130 and the second inverter 210 side of the second own system side power relay 230.

The first control unit 160 turns the first own system power relay 130 ON and turns the first other system power relay 135 OFF, when the first inverter input voltage V1 is in a normal condition. Also, the first control unit 160 turns the first own system power relay 130 OFF and turns the first other system power relay 135 ON, when the first inverter input voltage V1 is in an abnormal condition and the second inverter input voltage V2 is in a normal condition. Thus, when the first PIG power system is in an abnormal condition, power can be supplied to the first system L1 from the second PIG power system.

The second control unit 260 turns the second own system power relay 230 ON, and turns the second other system power relay 235 OFF, when the second inverter input voltage V2 is in a normal condition. The second control unit 260 turns the second own system power relay 230 OFF and turns the second other system power relay 235 ON, when the second inverter input voltage V2 is in an abnormal condition and the first inverter input voltage V1 is in a normal condition. Thus, power can be supplied to the second system L2 from the first PIG power system, when the second PIG power system is in an abnormal condition.

According to the first embodiment, the first PIG terminal 103 corresponds to "first connector supply terminal", and the second PIG terminal 203 corresponds to "second connector supply terminal".

The electric power steering apparatus 8 is provided with the motor control unit 1, the motor 80, and the reduction gear 89 as a power transmission member.

The motor 80 outputs an auxiliary torque that assists the steering operation of the driver.

The reduction gear 89 transmits a rotation of the motor 80 to the steering shaft 92.

Specifically, the motor control unit 1 according to the first embodiment is adapted for the electric power steering apparatus 8. The motor control unit 1 is configured such that every component disposed through the connectors 101 and 201 to the inverters 110 and 210, and the control units 160 and 260 are provided by pairs. Accordingly, in the case where a failure occurs in either one system, the other system can assist the steering operation.

Second Embodiment

The second embodiment of the present invention will be described with reference to FIGS. 10 to 14.

The motor control unit 2 according to the second embodiment differs from the first embodiment, in that 2 voltage detectors are provided for every system.

Figure 10:
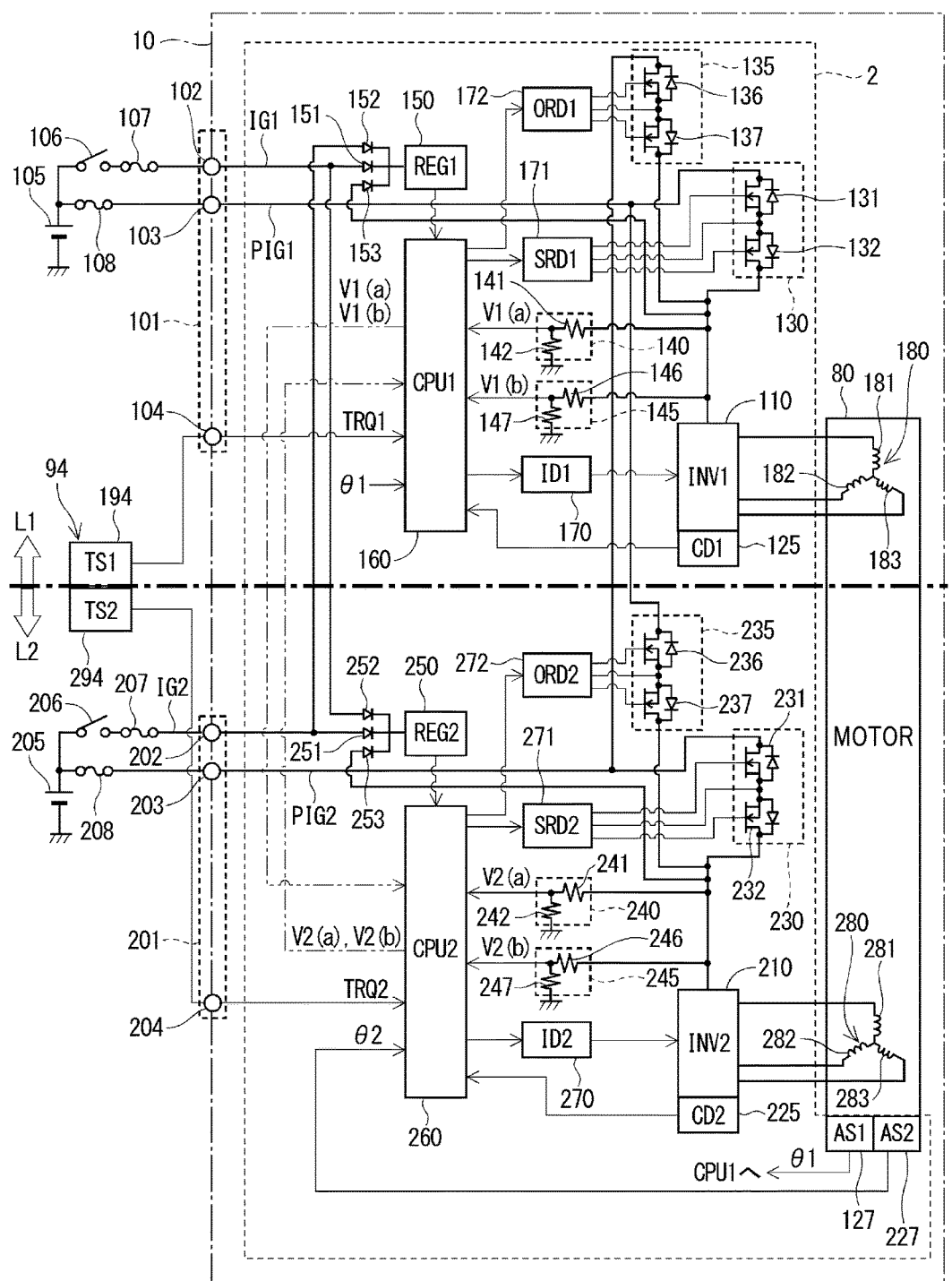
FIG. 10 is a circuit diagram showing a motor control unit according to the second embodiment of the present disclosure.
Figure 11:
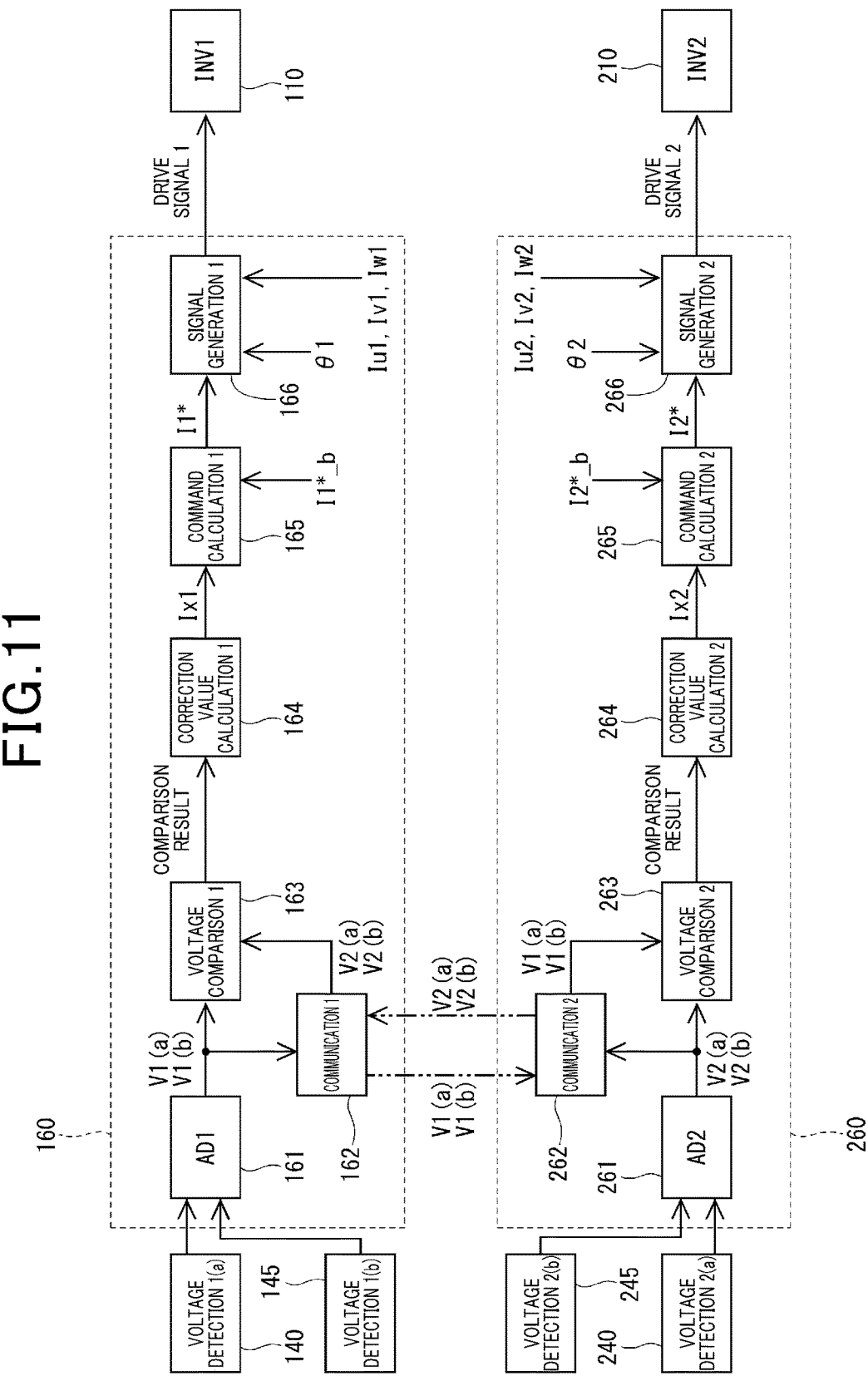
FIG. 11 is a block diagram showing a first control unit and a second control unit according to the second embodiment of the present disclosure.

Specifically, as shown in FIGS. 10 and 11, the first system L1 is provided with a first voltage detector 145 in addition to the first voltage detector 140 of the first embodiment, as detectors that detect the voltage of the first PIG line. The first voltage detector 145 includes, similar to the first voltage detector 140, resistors 146 and 147 as a voltage divider disposed between the first PIG line and the ground. According to the second embodiment, a first inverter input voltage V1 (a) is defined as a detection value based on the first voltage detector 140, and first inverter input voltage V1(b) is defined as a detection value based on the first voltage detector 145.

The first inverter input voltages V1 (a) and V1 (b) are both outputted to the first control unit 160. The first inverter input voltages V1 (a) and V1 (b) are outputted to the second control unit 260 from the first communication unit 162.

The second system L2 is provided with a second voltage detector 245 in addition to the second voltage detector 240 of the first embodiment, as detectors that detect the voltage of the second PIG line. The second voltage detector 245 includes, similar to the second voltage detector 240, resistors 246 and 247 as a voltage divider disposed between the second PIG line and the ground. According to the second embodiment, a second inverter input voltage V2 (a) is defined as a detection value based on the second voltage detector 240, and second inverter input voltage V2(b) is defined as a detection value based on the second voltage detector 245.

The second inverter input voltages V2 (a) and V2 (b) are both outputted to the second control unit 260. The second inverter input voltages V2 (a) and V2 (b) are outputted to the first control unit 160 from the second communication unit 262.

In FIG. 11, the first voltage detectors 140 and 145 are labeled by 1(a) and 1(b) respectively to distinguish therebetween. Similarly, the second voltage detectors 240 and 245 are labeled by 2(a) and 2(b) respectively. The detection values of the voltage detectors 140 and 145 are A-D converted by a single AD conversion unit 161, but the AD conversion unit may be provided for each detector. Similarly, the detection values of the voltage detectors 240 and 245 are A-D converted by a single AD, but the AD conversion unit may be provided for each detector. Configuration shown in FIG. 16 which will be described later is similar to the above-mentioned configuration.

A fault determination process according to the second embodiment is shown in FIG. 12.

According to the second embodiment, since the first system L1 is provided with two voltage detectors 140 and 145 which detect the inverter input voltages V1(a), and V1(b), location of the failure can be identified such that whether the failure has occurred in the first PIG wiring or the first own system power relay 130, or the failure has occurred in the voltage detectors 140 and 145.

In other words, as shown in FIG. 12, when both of the inverter input voltages V1 (a) and V1 (b) have abnormal values, the process determines that failure has occurred in the first PIG power system. On the other hand, when the inverter input voltage V1 (a) shows an abnormal value and the inverter input voltage V1 (b) shows a normal value, the process determines that a failure has occurred in the voltage detector 140. Also, when the inverter input voltage V1 (a) shows a normal value and the inverter input voltage V1 (b) shows an abnormal value, the process determines that a failure has occurred in the voltage detector 145.

Similarly, since the second system L2 is provided with two voltage detectors 240 and 245 which detect the inverter input voltages V2 (a), and V2 (b), location of the failure can be identified such that whether the failure has occurred in the second PIG wiring or the second own system power relay 230, or the failure has occurred in the voltage detectors 240 and 245.

In other words, as shown in FIG. 12, when both of the inverter input voltages V2 (a) and V2 (b) have abnormal values, the process determines that failure has occurred in the second PIG power system. On the other hand, when the inverter input voltage V2 (a) shows an abnormal value and the inverter input voltage V2 (b) shows a normal value, the process determines that a failure has occurred in the voltage detector 240. Also, when the inverter input voltage V2 (a) shows a normal value and the inverter input voltage V2 (b) shows an abnormal value, the process determines that a failure has occurred in the voltage detector 245.

The detailed fault determination is similar to that of the first embodiment.

According to the second embodiment, even when either one detector among the voltage detectors 140 and 145 is in an abnormal condition, power can be continuously supplied from the first battery 105 as long as the first PIG power system is in normal condition. Also, even when either detector among the voltage detectors 240 and 245 is in an abnormal condition, power can be continuously supplied from the second battery 205 as long as the second PIG power system is in a normal condition. Moreover, current limiting operation can be performed similar to the above-described embodiments, by using the detection value of the voltage detector which is in normal condition.

In the case where the first PIG power system or the second PIG power system is in an abnormal condition, a fault procedure of a power system failure is executed.

Thus, a plurality of voltage detectors are provided corresponding to each system, thereby determining whether a failure has occurred in the power system or in the voltage detector. As a result, an appropriate measure depending on the failure can be performed.

Figure 13:
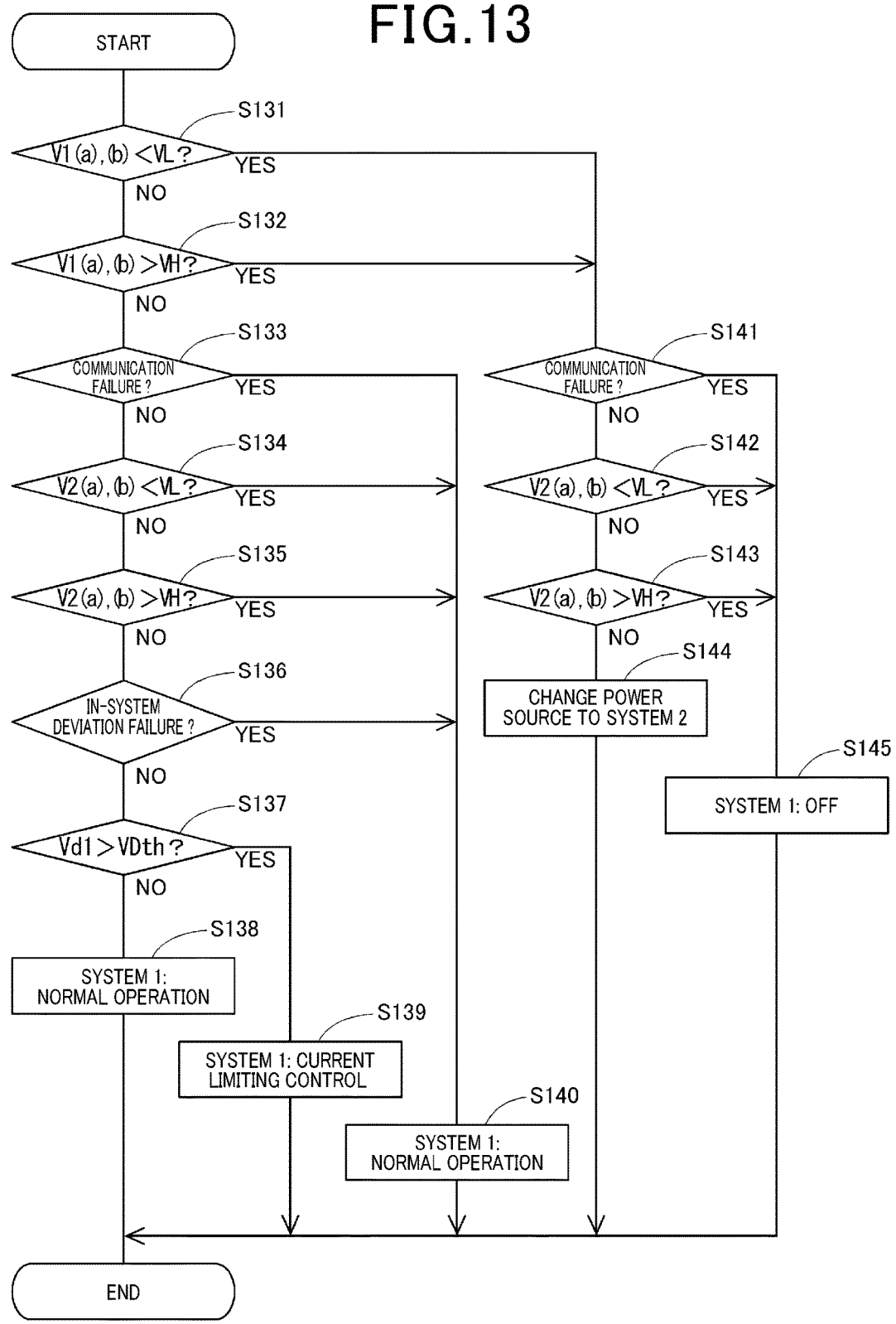
FIG. 13 is a flowchart showing a motor control process in the first control unit according to the second embodiment of the present disclosure.
Figure 14:
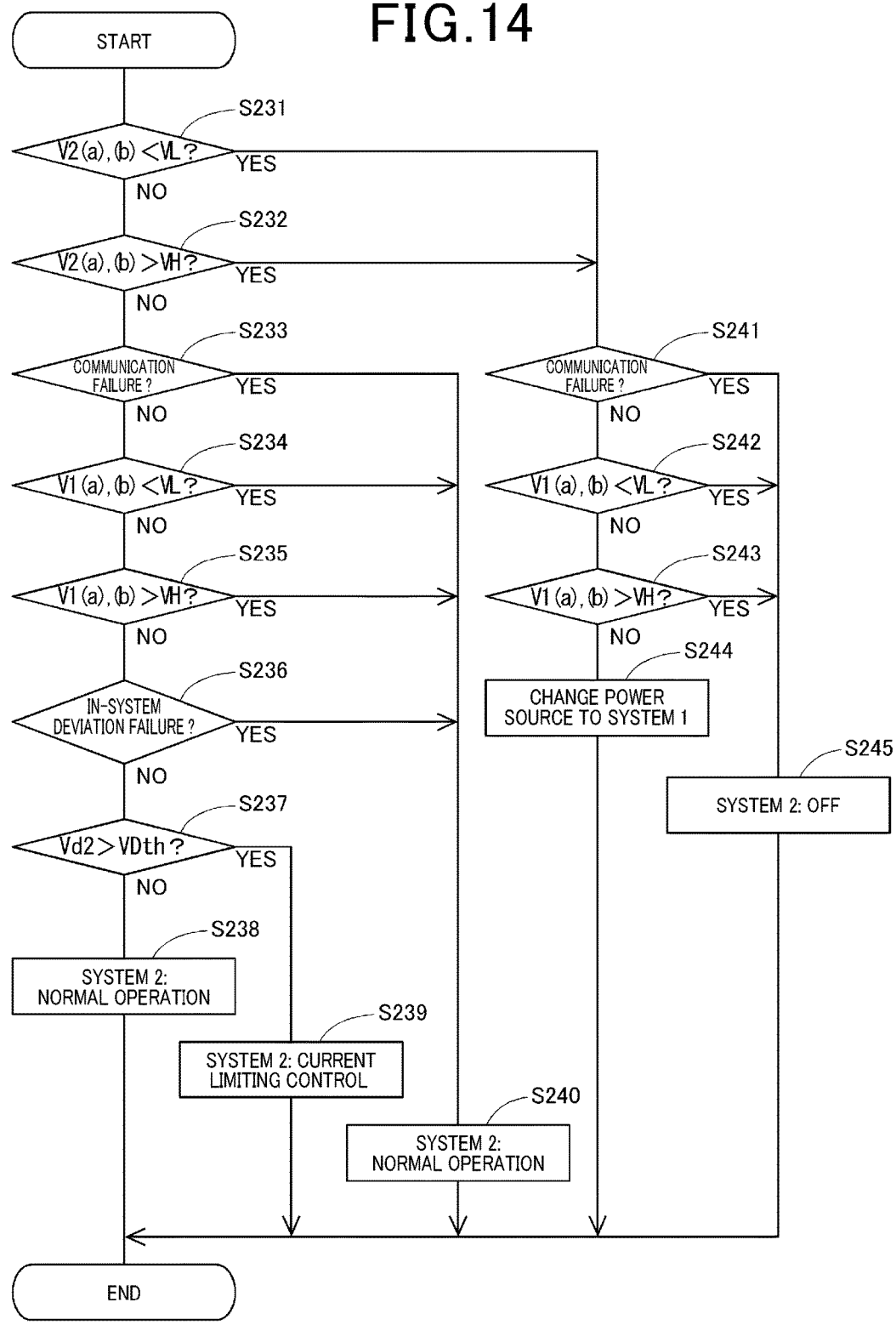
FIG. 14 is a flowchart showing a motor control process in the second control unit according to the second embodiment of the present disclosure.

The motor control processes of the second embodiment are shown in FIGS. 13 and 14. FIG. 13 is a flowchart showing processes executed by the first control unit 160. FIG. 14 shows processes executed by the second control unit 260. At S131 and S132, the first voltage comparison unit 163 performs similar processes to S101 and S102 shown in FIG. 6, using two first inverter input voltages V1 (*a*), V1 (*b*). When both of the first inverter input voltages V1 (*a*) and V1 (*b*) are in an abnormal condition (S131: YES, or S132: YES), the process proceeds to S141. When at least one of the first inverter input voltages V1 (*a*) or V1 (*b*) is in a normal condition (S131: NO, and S132: NO), the process proceeds to S133.

In the case where occurrence of failure is determined in advance for the voltage detectors 140 and 145, the process does not use detection value of voltage detector at which the failure is determined. Moreover, when either the first inverter input voltages V1 (*a*) or V1 (*b*) is in an abnormal condition, the process determines a failure in the voltage detector corresponding to the abnormal condition of the first input voltage, and the voltage detector having the failure will not be used in the subsequent processes. For S134 and S135, similar procedure is applied as described above.

The process of S133 is similar to the process of S103 shown in FIG. 6, where the process proceeds to S140 when a communication error has occurred (S133: YES), and proceeds to S134 when no communication error has occurred (S133: NO).

In S134 and S135, the first voltage comparison unit 163 uses two second inverter input voltage V2 (*a*) and V2 (*b*) and performs similar processes to the S104 and S105 shown in FIG. 6. When the second inverter input voltages V2 (*a*) and V2 (*b*) are in an abnormal condition (S134: YES or S135: YES), the process proceeds to S140. When at least one of the second inverter input voltages V2 (*a*) or V2 (*b*) is in a normal condition (S134: NO and S135: NO), the process proceeds to S136.

At S136, the first voltage comparison unit 163 determines whether or not an in-system deviation failure has occurred in at least one system. The in-system deviation failure is defined as a failure where two inverter input voltages V1 (*a*) and V1 (*b*) are different due to offset errors or the like, when both of the inverter input voltages V1 (*a*) and V1 (*b*) are within a normal range. The process determines that an in-system deviation error has occurred when the in-system deviation D1 and D2 (see equations (4) and (5)) is larger than a deviation error determination threshold Dth which is set depending on the detection error or the like.

$$D1=|V1(a)-V1(b)| \quad (4)$$

$$D2=|V2(a)-V2(b)| \quad (5)$$

When it is determined that at least one system has an in-system deviation error (S136: YES), in other words, at least one of in-system deviations D1 and D2 is larger than the deviation error determination threshold Dth, the process proceeds to S140. When no in-system deviation error is detected (S136: NO), the process proceeds to S137.

According to the second embodiment, when the in-system deviation error has occurred, since the process cannot identify which detection voltage is correct, the current limiting control by a voltage comparison between two systems is not performed.

When the inverter input voltage V1 (*a*) or V1 (*b*) is in an abnormal condition, since the in-system deviation D1 cannot be calculated, the determination process of whether or not an in-system deviation error has occurred in the first system L1 is omitted. Similarly, when the inverter input voltages V2 (*a*) and V2 (*b*) are in an abnormal condition, since the in-system deviation D2 cannot be calculated, the determination process of whether or not an in-system deviation error has occurred in the second system L2 is omitted.

The processes of S137 to S140 are similar to the S106 to S109 shown in FIG. 6.

For the values used for the calculation in accordance with the equation (1), as voltage V1, V1 (*a*) or V1 (*b*) may be used as long as the voltages V1(*a*) and V1(*b*) are within a normal range, or a calculated value such as an average value may be used. Moreover, in the case where either V1 (*a*) or V1 (*b*) has an abnormal value, the correct value is used. Similarly, the correct value is used for V2. Also, the correct value is used for the calculation in accordance with the equation (3) in S237.

The processes of S141 to S143 are similar to the processes of S133 to S135.

The processes of S144 and S145 are similar to the processes of S113 and S114 shown in FIG. 6.

As shown in FIG. 14, at S231 and S232, the second voltage comparison unit 263 performs processes similar to S134 and S135 shown in FIG. 13. When both of the second inverter input voltages V2 (*a*) and V2 (*b*) are in an abnormal condition (S231: YES, or S232: YES), the process proceeds to S241. When at least one of the second inverter input voltage V2 (*a*) or V2 (*b*) is in a normal condition (S231: NO, and S232: NO), the process proceeds to S233.

The process of S233 is similar to the process of S203 shown in FIG. 7. When it is determined that a communication error has occurred (S233: YES), the process proceeds to S240. When it is determined that no communication error has occurred (S233: NO), the process proceeds to S234.

At S234 and S235, the second voltage comparison unit 263 performs processes similar to S131 and S132 shown in FIG. 13. When both of the first inverter input voltages V1 (*a*) and V1 (*b*) are in an abnormal condition (S234: YES, or S235: YES), the process proceeds to S240. When at least one of the first inverter input voltage V1 (*a*) or V1 (*b*) is in a normal condition (S234: NO, and S235: NO), the process proceeds to S236.

At S236, similar to S136 shown in FIG. 13, the second voltage comparison unit 263 determines whether or not an in-system deviation failure has occurred. When it is determined that the in-system deviation failure has occurred (S236: YES), the process proceeds to S240. When it is determined that no in-system deviation failure has occurred (S236: NO), the process proceeds to S237.

The processes of S237 to S240 are similar to those of S206 to S209 shown in FIG. 7.

The processes of S241 to S243 are similar to those of S233 to S235.

The processes of S244 and S245 are similar to those of S213 and S214 shown in FIG. 7.

According to the second embodiment, a plurality of the first voltage detectors 140 and 145, and a plurality of the second voltage detectors 240 and 245, are provided. According to the second embodiment, two voltage detectors are provided for each system. The voltage detectors are duplicated thereby identifying whether failure of the voltage detector or a failure of the PIG power system has occurred.

Moreover, similar effects and advantages to the above-described embodiment can be obtained.

Third Embodiment

The third embodiment of the present disclosure will be described with reference to FIGS. 15 to 19.

Figure 15:
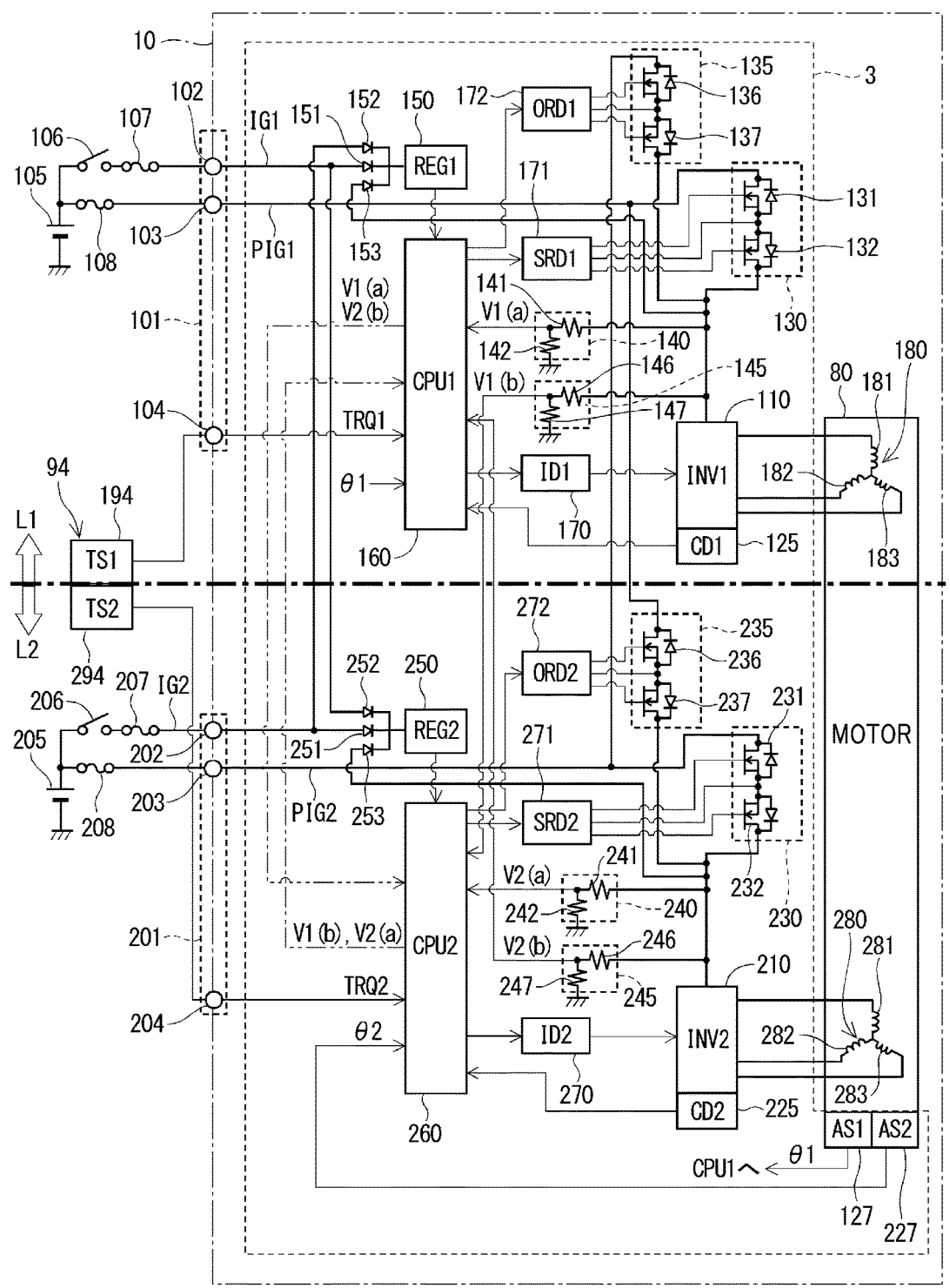
FIG. 15 is a circuit diagram showing a motor control unit according to a third embodiment of the present disclosure.
Figure 16:
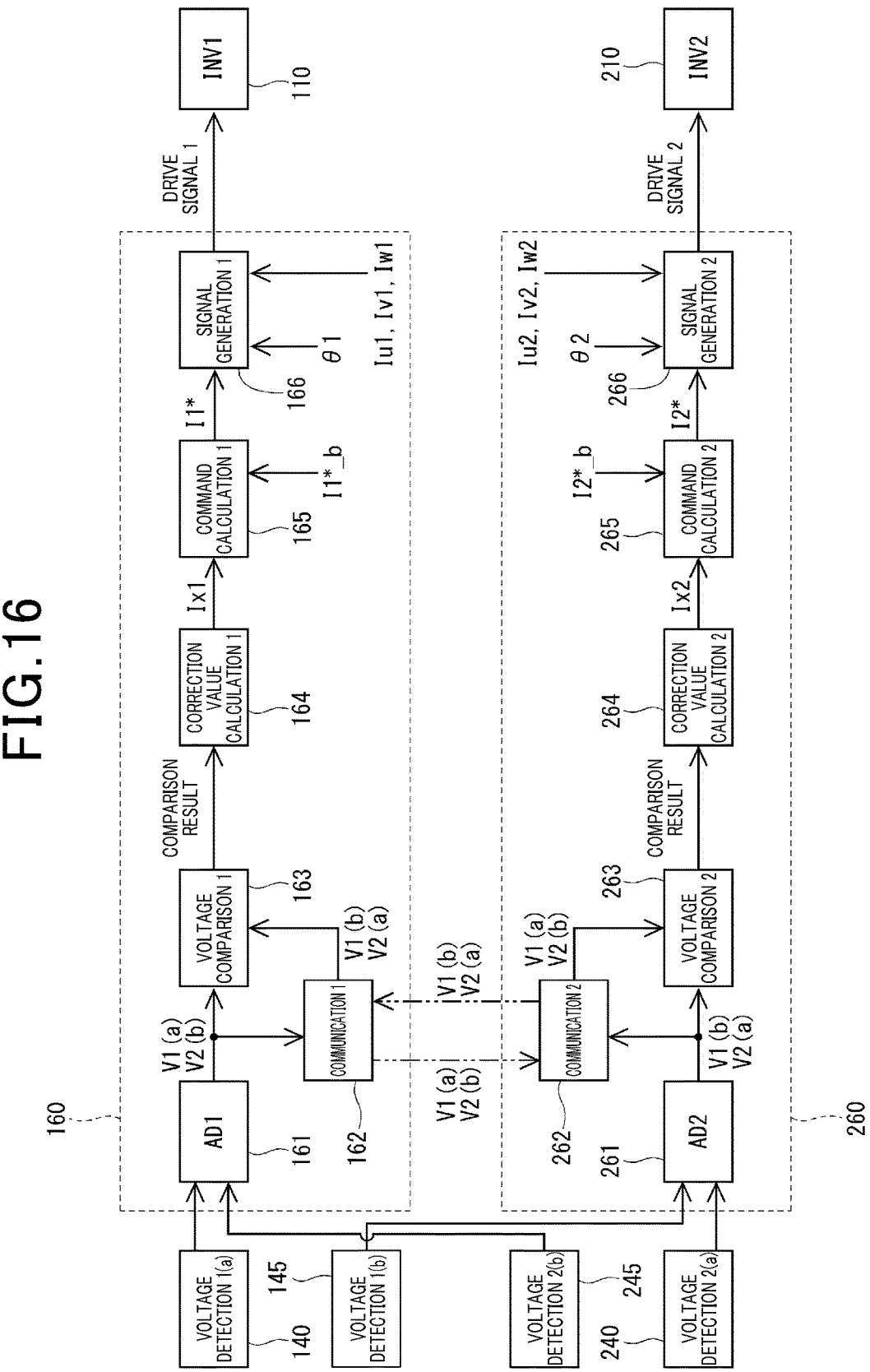
FIG. 16 is a block diagram showing a first control unit and a second control unit according to the third embodiment of the present disclosure.

As shown in FIGS. 15 and 16, similar to the second embodiment, a motor control unit 3 according to the third embodiment is provided with two voltage detectors 140 and 145 in the first system L1, and two voltage detectors 240 and 245 are provided for the second system L2.

According to the third embodiment, the first inverter input voltage V1 (a) detected by the first voltage detector 140 is outputted to the first control unit 160, and the first inverter input voltage V1 (b) detected by the first voltage detector 145 is outputted to the second control unit 260. Similarly, the second inverter input voltage V2 (a) detected by the second voltage detector 240 is outputted to the second control unit 260, and the second inverter input voltage V2 (b) detected by the second voltage detector 245 is outputted to the first control unit 160.

The first control unit 160 acquires the first inverter input voltage V1 (b) and the second inverter input voltage V2 (a) from the second control unit 260 via the communication line. The second control unit 260 acquires the first inverter input voltage V1 (a) and the second inverter input voltage V2 (b) from the first control unit 160 via the communication line.

A fault determination process according to the third embodiment is shown in FIG. 17.

According to the third embodiment, two voltage detectors are provided for each system. Hence, similar to the second embodiment, failure can be determined whether in the PIG power system or the voltage detector. The detailed configuration of the fault determination is the same as the above-described embodiments.

Since the first control unit 160 directly acquires the first inverter voltage V1(a) and the second inverter V2 (b), even when a communication error occurs at a conduction path from the second control unit 260 to the first control unit 160, the first inverter input voltage V1 (a) and the second inverter input voltage V2 (b) can be utilized for the current limiting control or the like. Similarly, since the second control unit 260 directly acquires the first inverter voltage V1(b) and the second inverter V2 (a), even when a communication error occurs at a conduction path from the first control unit 160 to the second control unit 260, the first inverter input voltage V1 (b) and the second inverter input voltage V2 (a) can be utilized for the current limiting control or the like.

Figure 18:
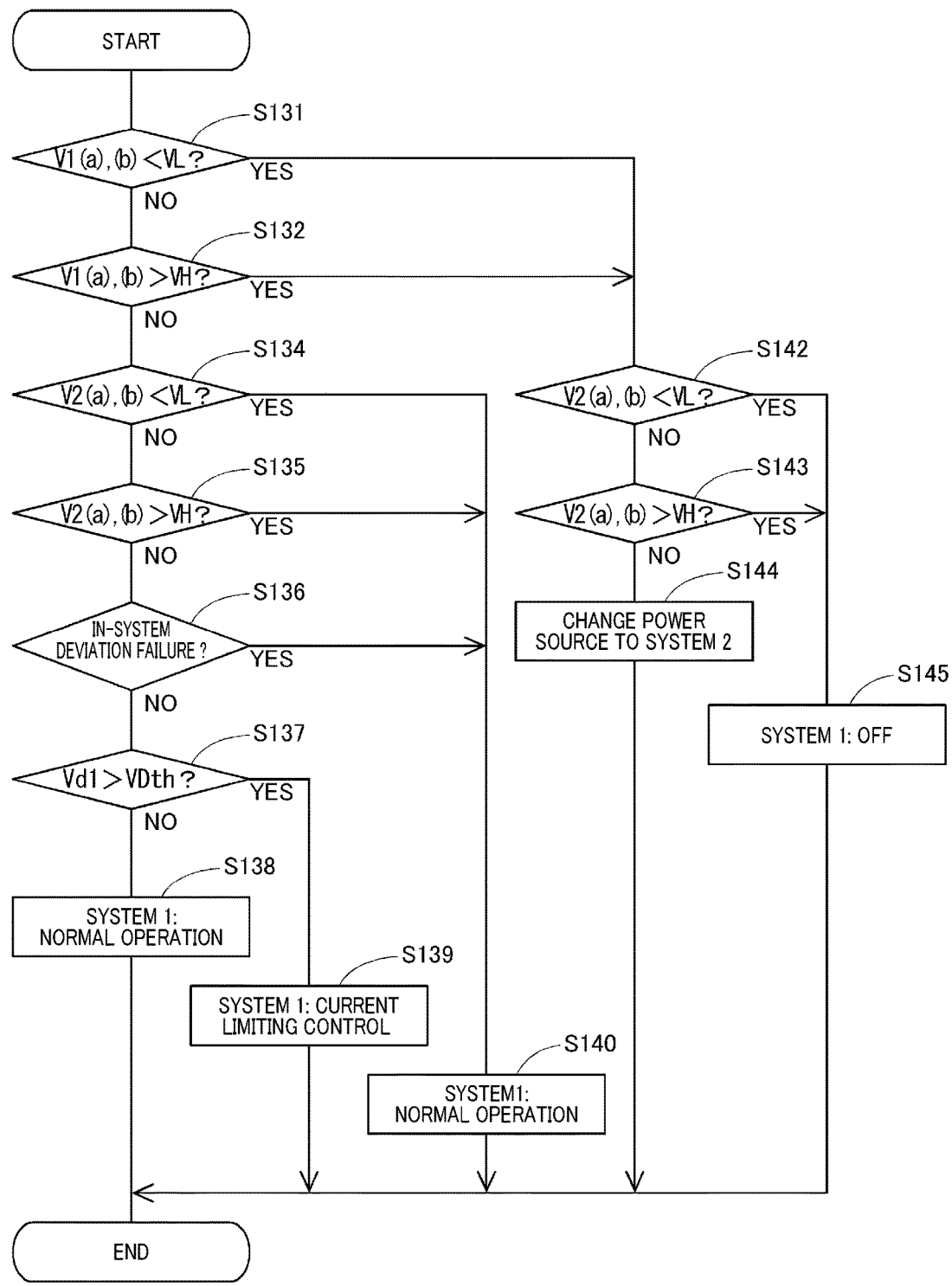
FIG. 18 is a flowchart showing a motor control process in the first control unit according to the third embodiment of the present disclosure.
Figure 19:
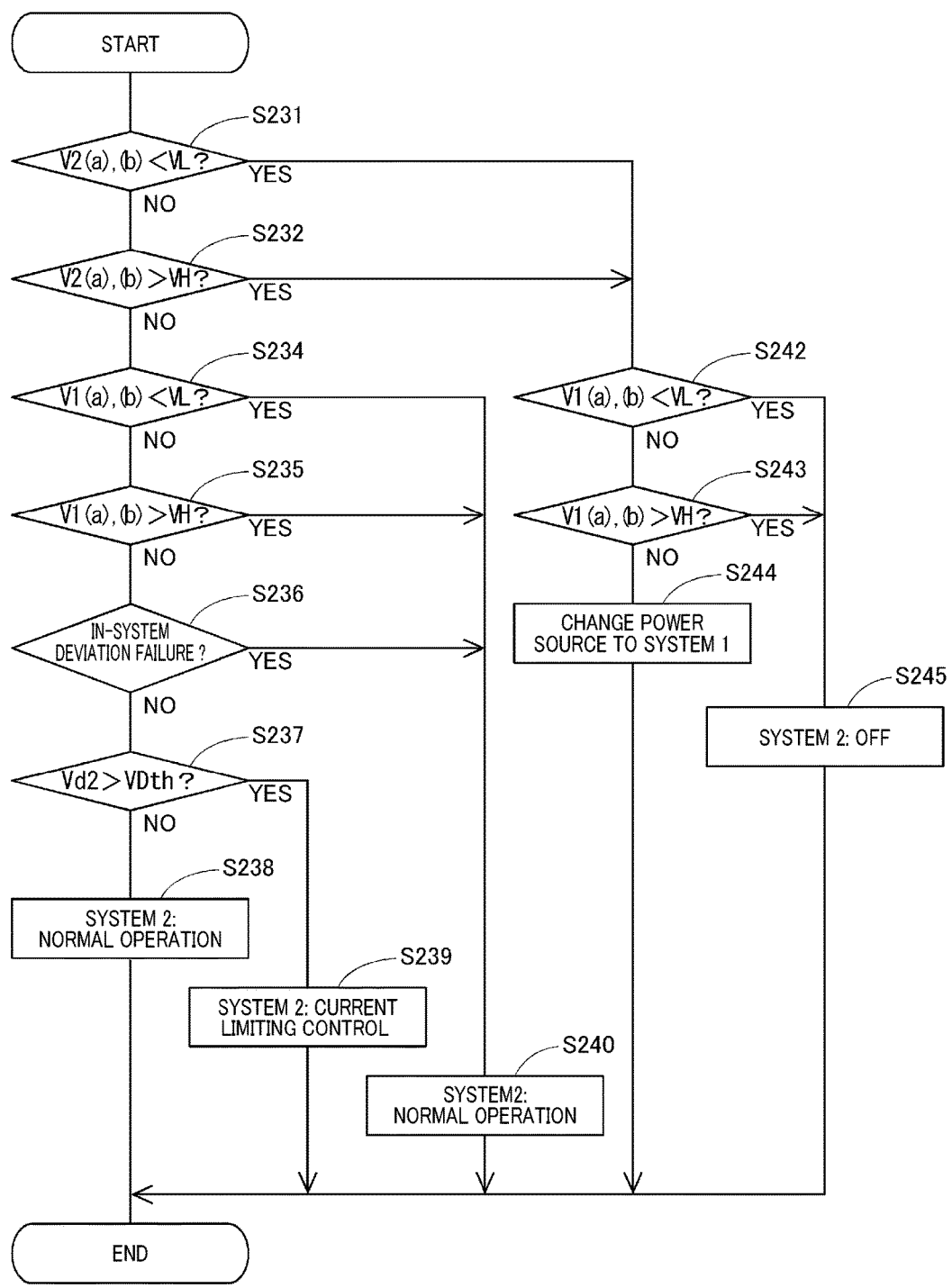
FIG. 19 is a flowchart showing a motor control process in the second control unit according to the third embodiment of the present disclosure.

A fault determination process according to the third embodiment is shown in FIGS. 18 and 19.

FIG. 18 shows a process executed by the first control unit 160 which is similar to the process shown in FIG. 13 except that processes of S133 and S141 are omitted. FIG. 19 shows a process executed by the second control unit 260 which is similar to the process shown in FIG. 14 except that processes of S233 and S241 are omitted.

In other words, according to the third embodiment, since the first control unit 160 directly acquires the inverter input voltage V1(a) and V2(b) without using a communication method, the current limiting control depending on the first differential value Vd1 can be performed as long as the PIG power system is in a normal condition, even when a communication error has occurred.

Since the second control unit 260 directly acquires the inverter input voltages V1(b) and V2 (a) without using a communication method, the current limiting control depending on the second differential value Vd2 can be performed as long as the PIG power system is in a normal condition, even when a communication error has occurred.

According to the third embodiment, each of the first voltage detector and the second voltage detector is provided in plural number, corresponding to the first voltage detectors 140 and 145 and the second voltage detectors 240 and 245.

The first inverter input voltage V1 (a) detected by one first voltage detector 140 is outputted to the first control unit 160, and transmitted to the second control unit 260 from the first control unit 160 by a communication line. The first inverter input voltage V1 (b) detected by the other first voltage detector 145 is outputted to the second control unit 260, and transmitted to the first control unit 160 from the second control unit 260 by a communication line.

Also, the second inverter input voltage V2 (a) detected by one second voltage detector 240 is outputted to the second control unit 260, and transmitted to the first control unit 160 from the second control unit 260 by a communication line. The second inverter input voltage V2 (b) detected by the other second voltage detector 245 is outputted to the first control unit 160, and transmitted to the second control unit 260 from the first control unit 160 by a communication line.

Thus, even in the case where a communication error occurs between the first control unit 160 and the second control unit 260, the current limiting control can be controlled by comparing voltages between two systems.

Similar effects to the above-described embodiments can be obtained.

Other Embodiments (A) Current Limiting Control

According to the above-described embodiments, when the differential value of the inverter input voltage is larger than the determination threshold, the basic command value is corrected to be negative-side in the system having lower inverter input voltage, thereby limiting the current command value. According to the other embodiments, when the basic command value is negative-corrected in the system having lower inverter input voltage, the basic command value may be positive-corrected (i.e., positive-side correction) in the system having higher inverter input voltage. The basic command value is positive-corrected in the system having higher inverter input voltage to cancel the correction value, whereby required current for driving the motor can be secured. It should be noted that the correction value of the positive-correction may be the same as the correction value of the negative-correction or may not be the same.

Also, according to the other embodiment, instead of using the negative-correction of the basic command value, the current command value may be limited such that an upper limit is set for the current command value and the current command value is limited to the upper limit value when the basic command value exceeds the upper limit. Since an amount of the current is limited by the upper limit, a battery in one system having relatively larger degree of degradation than that of other system can be prevented from being further degraded. Further, heat produced at a location having increasing contact resistance can be minimized.

(B) Voltage Detector

According to the above-described embodiments, one or two voltage detector is provided for each system. According to other embodiment, three or more voltage detectors may be provided for each system. In this case, similar to the second embodiment, the detection values of all voltage detectors may be outputted to the control unit of the own system and transmitted to the control unit of the other system via the communication line, or similar to the third embodiment, the detection value of a part of the voltage detectors may be outputted to the control unit of the own system, and the detection value of the other voltage detector may be outputted to the control unit of the other system.

(C) Drive Apparatus

According to the above-described embodiments, power is supplied to the first system from the first battery, and power is supplied to the second system from the second battery. According to other embodiments, batteries and fuses may be commonly used. Also, connectors may be commonly used. In other embodiments, applicable voltage or the like may be different between the first battery and the second battery. In this case, a converter performing a step-up conversion or a step-down conversion may preferably be provided between at least one of the first battery or the second battery and the drive apparatus.

According to the above-described embodiments, the motor section is configured of a three-phase brushless motor. In other embodiments, the motor section is not limited to the three-phase brushless motor, but any kind of motor may be used. Further, the motor section is not limited to a motor, but may be configured of a generator, or so-called motor generator having both motor and generator functions. According to the above-described embodiments, the drive apparatus is applied to an electric power steering apparatus. In other embodiments, the drive apparatus may be applied to an apparatus other than the electric power steering apparatus.

As described, the present invention is not limited to the above-described embodiments. However, various modifications can be applied thereto without departing the scope of the present invention.

What is claimed is:

1. An apparatus for controlling a rotary electric machine provided with a first winding group and a second winding group, the apparatus comprising:
   a first inverter connected to the first winding group, the first inverter including a plurality of first switching elements;
   a second inverter connected to the second winding group, the second inverter including a plurality of second switching elements;
   a first voltage detector that detects a first inverter input voltage entering the first inverter;
   a second voltage detector that detects a second inverter input voltage entering the second inverter;
   a first control unit that controls ON/OFF operation of the first switching elements; and
   a second control unit that controls ON/OFF operation of the second switching elements,
   wherein
   the first control unit limits a first current command value related to a current flowing through the first winding group, when both of the first inverter input voltage and the second inverter input voltage are in a normal condition, and a first differential value, which is obtained by subtracting the first inverter input voltage from the second inverter input voltage, is larger than a determination threshold; and
   the second control unit limits a second current command value related to a current flowing through the second winding group, when both of the first inverter input voltage and the second inverter input voltage are in a normal condition, and a second differential value, which is obtained by subtracting the second inverter input voltage from the first inverter input voltage, is larger than the determination threshold.

2. The apparatus according to claim 1, wherein
the first control unit performs a negative-side correction for a first basic command value, by using a first correction value calculated based on the first differential value; and
the second control unit performs a negative correction for a second basic command value, by using a second correction value calculated based on the second differential value.

3. The apparatus according to claim 1, wherein
the first inverter input voltage is outputted to the first control unit, the first inverter input voltage being transmitted to the second control unit from the first control unit by a communication; and
the second inverter input voltage is outputted to the second control unit, the second inverter input voltage being transmitted to the first control unit from the second control unit by a communication.

4. The apparatus according to claim 1, wherein
each of the first voltage detector and the second voltage detector is provided in plural number.

5. The apparatus according to claim 1, wherein
each of the first voltage detector and the second voltage detector is provided in plural number;
the first inverter input voltage detected by of the first voltage detector is outputted to the first control unit, and the first inverter input voltage being transmitted to the second control unit from the first control unit by a communication;
the first inverter input voltage detected by another first voltage detector is outputted to the second control unit, and the first inverter input voltage detected by the another first voltage detector being transmitted to the first control unit from the second control unit by a communication;
the second inverter input voltage detected by of the second voltage detector is outputted to the second control unit, and the second inverter input voltage being transmitted to the first control unit from the second control unit by a communication; and
the second inverter input voltage detected by another second voltage detector is outputted to the first control unit, and the second inverter input voltage detected by the another second voltage detector being transmitted to the second control unit from the first control unit by a communication.

6. The apparatus according to claim 1, wherein
the apparatus includes:
a first own system power relay provided between a first connector supply terminal and the first inverter;
a second own system power relay provided between a second connector supply terminal and the second inverter;
a first other system power relay provided at a wiring which connects between a second connector supply terminal side of the second own system power relay and a first inverter side of the first own system power relay; and
a second other system power relay provided at a wiring which connects between a first connector supply terminal side of the first own system power relay and a second inverter side of the second own system power relay, wherein
the first control unit is configured to turn the first own system power relay ON and turn the first other system power relay OFF, when the first inverter input voltage is in a normal condition, and configured to turn the first own system power relay OFF and turn the first other system power relay ON, when the first inverter input voltage is in an abnormal condition and the second inverter input voltage is in a normal condition; and the second control unit is configured to turn the second own system power relay ON and turn the second other system power relay OFF, when the second inverter input voltage is in a normal condition, and configured to turn the second own system power relay OFF and turn the second other system power relay ON, when the second inverter input voltage is in an abnormal condition and the first inverter input voltage is in a normal condition.

7. An electric power steering apparatus comprising:
a rotary electric machine provided with a first winding group and a second winding group, the rotary electric machine outputting an auxiliary torque that assists a steering operation of a driver;
an apparatus for controlling the rotary electric machine, including:
  a first inverter connected to the first winding group, the first inverter including a plurality of first switching elements;
  a second inverter connected to the second winding group, the second inverter including a plurality of second switching elements;
  a first voltage detector that detects a first inverter input voltage entering the first inverter;
  a second voltage detector that detects a second inverter input voltage entering the second inverter;
  a first control unit that controls ON/OFF operation of the first switching elements; and
  a second control unit that controls ON/OFF operation of the second switching elements, wherein
  the first control unit limits a first current command value related to a current flowing through the first winding group, when both of the first inverter input voltage and the second inverter input voltage are in a normal condition, and a first differential value, which is obtained by subtracting the first inverter input voltage from the second inverter input voltage, is larger than a determination threshold; and
  the second control unit limits a second current command value related to a current flowing through the second winding group, when both of the first inverter input voltage and the second inverter input voltage are in a normal condition, and a second differential value, which is obtained by subtracting the second inverter input voltage from the first inverter input voltage, is larger than the determination threshold; and
a power transmission member that transmits a rotation of the rotary electric machine to a driving object.

* * * * *